(12) United States Patent
Luft et al.

(10) Patent No.: US 6,975,589 B2
(45) Date of Patent: Dec. 13, 2005

(54) METHOD AND APPARATUS FOR A HYBRID VARIABLE RATE PIPE

(75) Inventors: Siegfried Luft, Vancouver (CA); Gerald Neufeld, Los Altos, CA (US); David Stiles, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 981 days.

(21) Appl. No.: 09/887,957

(22) Filed: Jun. 22, 2001

(65) Prior Publication Data

US 2005/0002329 A1 Jan. 6, 2005

Related U.S. Application Data

(60) Provisional application No. 60/258,759, filed on Dec. 30, 2000.

(51) Int. Cl.⁷ ............................................... H04L 12/26
(52) U.S. Cl. ................... 370/222; 370/242; 370/391
(58) Field of Search .................. 370/222, 223, 370/228, 242, 249, 252, 391, 465, 468, 535, 545, 216, 352

(56) References Cited

U.S. PATENT DOCUMENTS

| 4,736,363 | A |   | 4/1988  | Aubin et al.    |
|-----------|---|---|---------|-----------------|
| 5,159,595 | A |   | 10/1992 | Flanagan et al. |
| 5,537,393 | A |   | 7/1996  | Shioda et al.   |
| 5,600,631 | A | * | 2/1997  | Takatori et al. ............ 370/217 |
| 5,719,858 | A |   | 2/1998  | Moore           |
| 5,764,392 | A |   | 6/1998  | Van As et al.   |
| 5,933,258 | A |   | 8/1999  | Flanagan et al. |
| 5,986,783 | A |   | 11/1999 | Sharma et al.   |
| 6,009,075 | A |   | 12/1999 | Roberts et al.  |
| 6,163,527 | A |   | 12/2000 | Ester et al.    |
| 6,249,510 | B1|   | 6/2001  | Thompson        |
| 6,269,452 | B1|   | 7/2001  | Daruwalla et al.|
| 6,442,694 | B1|   | 8/2002  | Bergman et al.  |
| 6,594,279 | B1| * | 7/2003  | Nguyen et al. ............. 370/468 |
| 6,606,667 | B1|   | 8/2003  | Hermann         |
| 6,616,350 | B1| * | 9/2003  | de Boer et al. ............. 370/222 |
| 6,628,649 | B1|   | 9/2003  | Raj et al.      |
| 6,654,354 | B1| * | 11/2003 | Watkins et al. ............. 370/258 |
| 6,683,891 | B1|   | 1/2004  | Mazzurco et al. |
| 6,725,401 | B1|   | 4/2004  | Lindhorst-Ko    |
| 6,765,916 | B1|   | 7/2004  | Duvvuru et al.  |
| 6,775,477 | B2|   | 8/2004  | Badr            |
| 6,782,000 | B2|   | 8/2004  | Subramanian et al. |
| 6,785,224 | B2|   | 8/2004  | Uematsu et al.  |
| 6,795,394 | B1| * | 9/2004  | Swinkels et al. ........... 370/222 |
| 2002/0080437 | A1 |   | 6/2002  | Sparks et al. |
| 2002/0118636 | A1 |   | 8/2002  | Phelps et al. |
| 2002/0167966 | A1 | * | 11/2002 | Coltro ........................ 370/465 |
| 2004/0202467 | A1 | * | 10/2004 | Luft et al. .................. 370/225 |

FOREIGN PATENT DOCUMENTS

WO    PCT/US01/49822    12/2001
WO    PCT/US01/50012    9/2002

OTHER PUBLICATIONS

S. Keshav, An Engineering Approach to Computer Networking ATM Networks, the Internet, and the Telephone Network, Chapter 8: Switching, pp. 159–175, Apr. 1997, Addison–Wesley Professional Computing Series, ibid Chapter 15: Common Protocols, pp. 502–505, 512–517.

(Continued)

*Primary Examiner*—Chi Pham
*Assistant Examiner*—AnhVu H Ly
(74) *Attorney, Agent, or Firm*—Blakely, Sokoloff, Taylor & Zafman LLP

(57) ABSTRACT

A method and apparatus for a hybrid variable rate pipe is described. In one embodiment of the invention, a computer implemented method comprises provisioning a hybrid variable rate pipe on a span of an optical ring and transmitting a set of traffic in the hybrid variable rate pipe.

10 Claims, 18 Drawing Sheets

OTHER PUBLICATIONS

Howard C. Berkowitz, Designing Routing and Switching Architectures for Enterprise Networks, Chapter 9: Connection–Oriented Switching, pp. 507–511, 1999, Network Architecture and Development Series, MacMillan Technical Publishing.

SONET NE View Requirements and Information Model, SIF Approved Document, SIF Document No. SIF–IM–9803–049R10, Information Modeling Group, Apr. 29, 1999.

Synchronous Optical Network (SONET)—Automatic Protection Switching, American National Standard for Telecommunications, ANSI TI.105.01–2000, Mar. 23, 2000.

Synchronous Optical Network (SONET)—Basic Description including Multiplex Structure, Rates, and Formats, American National Standard for Telecommunications, ANSI TI.105–1995, Oct. 27, 1995.

PCT/US01/50012 Search Report mailed Jun. 5, 2002.

Series G: Transmission Systems and Media, Digital Systems and Networks, Architecture of transport networks based on the synchronous digital hierarchy (SDH), ITU–T Recommendation G.803, Mar. 2000.

PCT/US01/49822 Examination Report mailed Sep. 12, 2002.

* cited by examiner

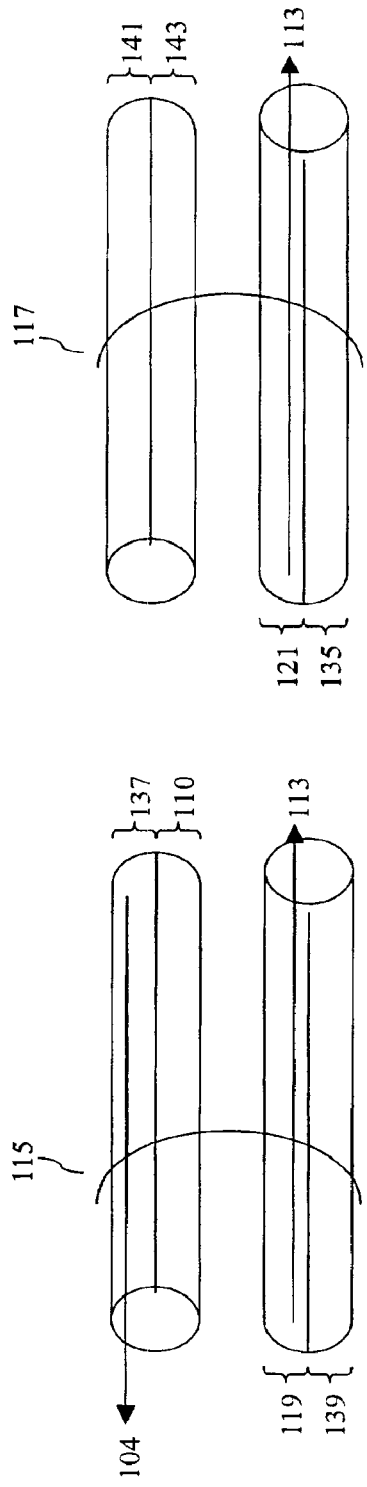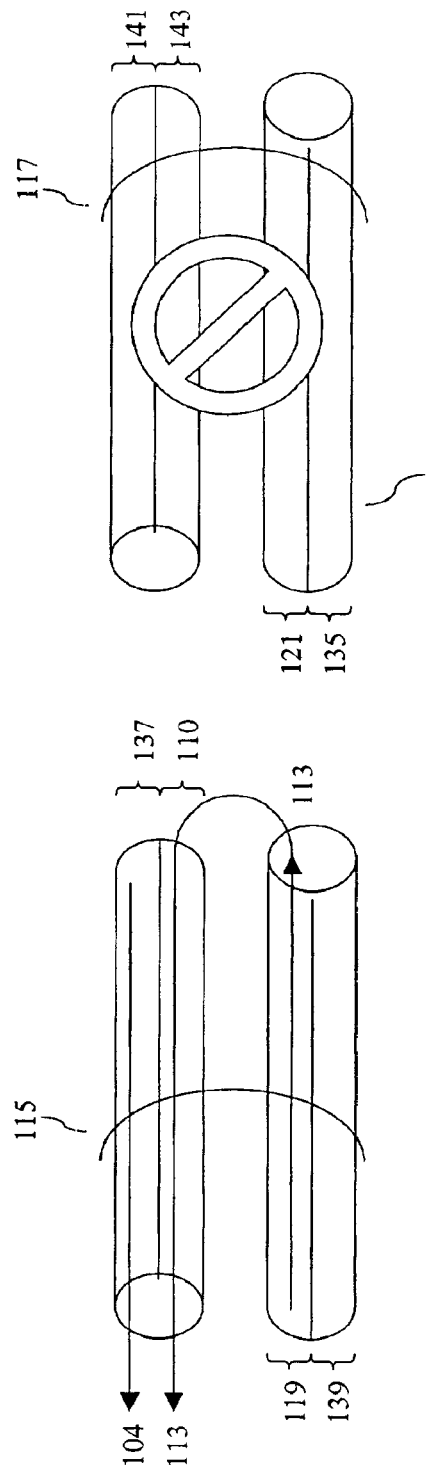
FIG. 1c
Figure 1d

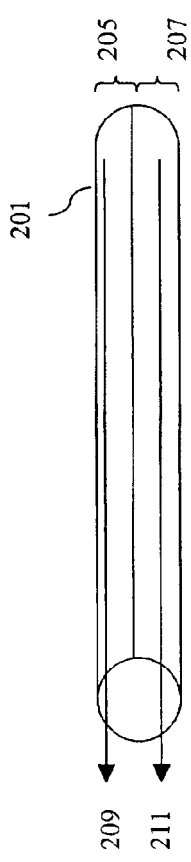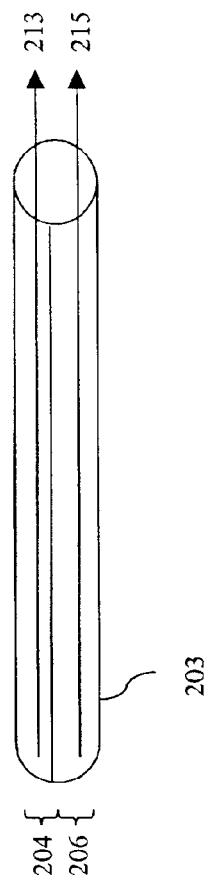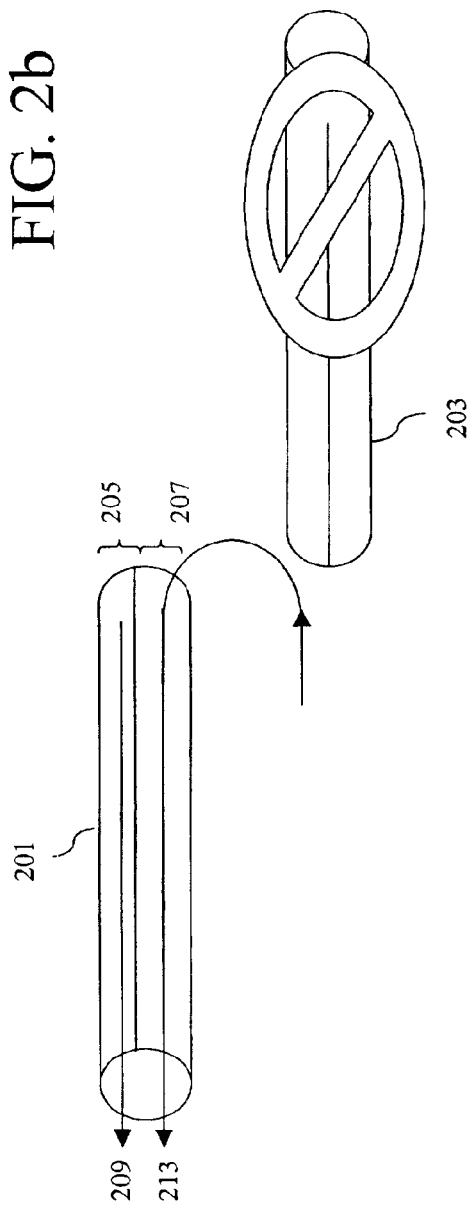

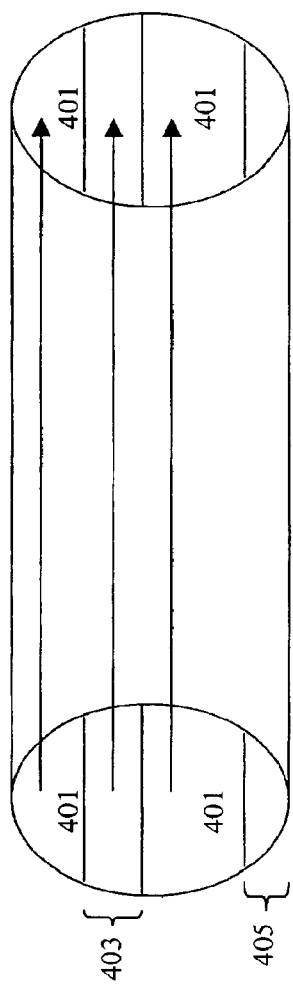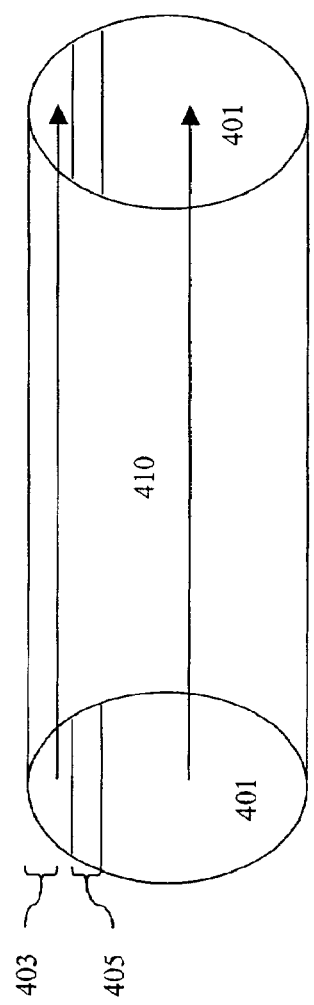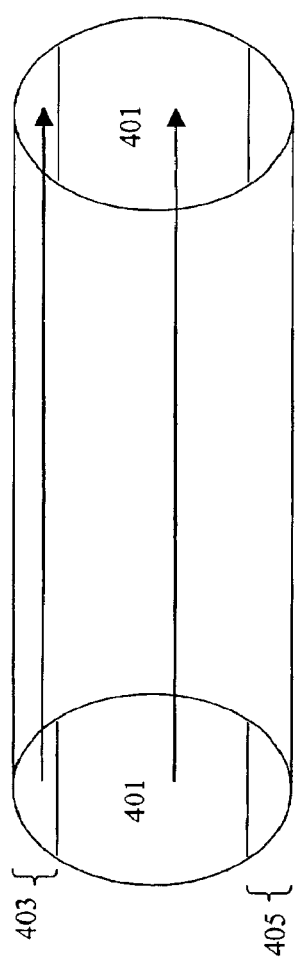

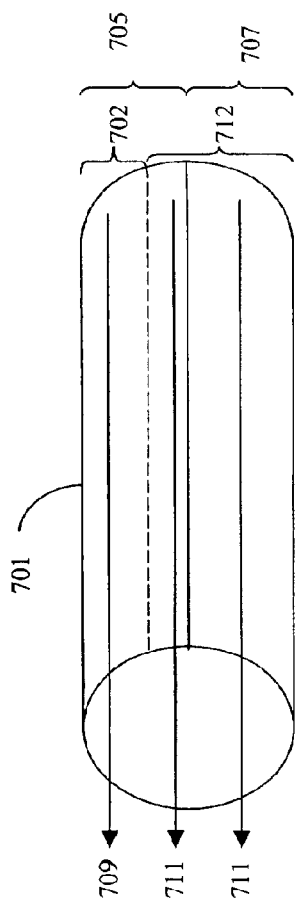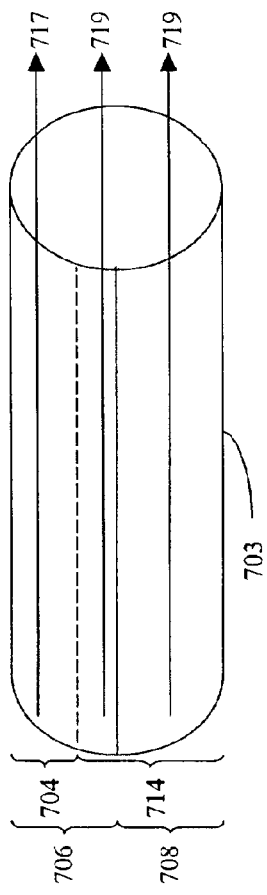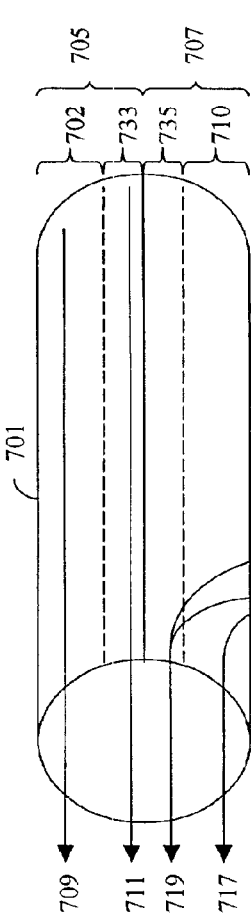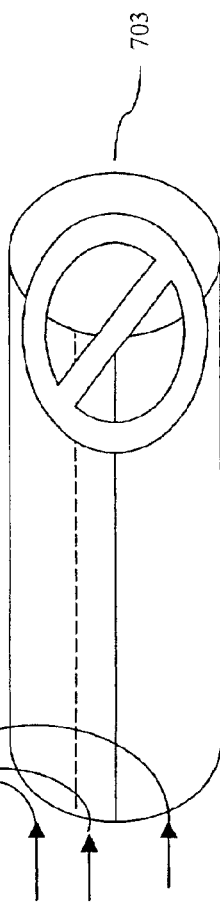
FIG. 7a
FIG. 7b

METHOD AND APPARATUS FOR A HYBRID VARIABLE RATE PIPE

CROSS-REFERENCE TO RELATED APPLICATIONS

This application claims the benefit of U.S. Provisional Patent Application No. 60/258,759, entitled "Method and Apparatus For A Hybrid Variable Rate Pipe" filed on Dec. 30, 2000.

BACKGROUND OF THE INVENTION

1. Field of the Invention

This invention relates to communication networks. More specifically, the present invention relates to communication over optical networks.

2. Description of the Related Art

Current networks must satisfy consumer demand for more bandwidth and a convergence of voice and data traffic. The increased demand of bandwidth by consumers combines with improved high bandwidth capacity of core networks to make edge networks a bottleneck despite the capacity of optical networks.

Multiplexing is used to deliver a variety of traffic over a single high speed broadband line. An optical standard such as Synchronous Optical Network (SONET) or Synchronous Digital Hierarchy (SDH) in conjunction with a multiplexing scheme is used to deliver various rates of traffic over a single high speed optical fiber. SONET/SDH is a transmission standard for optical networks which corresponds to the physical layer of the open standards institutes (OSI) network model. One of the protection schemes for SONET/SDH involves automatic protection switching (APS) in a bi-directional line switched ring (BLSR) architecture. BLSR utilizes linear switching to implement APS.

FIGS. 1a–1e are diagrams illustrating an example of traffic flow in a Bi-Directional Line Switched Ring (BLSR) while there is and is not a failure in the ring. FIG. 1a (Prior Art) is a diagram of exemplary traffic flow on a BLSR while there is not a failure. Although a BLSR has a working channel and a protection channel for traffic flowing East and West, only one working channel and its protection channel (which traverse the ring in the opposite direction) are shown in FIGS. 1a and 1b. In FIG. 1a, a stream of traffic 113 is received from a source external to the ring at node 101. Node 101 transmits this traffic 113 over its East span 115 on a working channel 119 to a node 103. Node 103 transmits the traffic 113 over its East span 117 in a working channel 121 to node 105. The stream of TDM traffic 113 exits the ring at node 105 to a destination external to the ring. Although extra traffic may be flowing in the protection channels of the ring, only the stream of TDM traffic 113 is shown for simplicity.

FIG. 1b (Prior Art) is a diagram of exemplary traffic flow on the BLSR while there is a failure. In FIG. 1b, the node 103's East span 117 has failed (e.g. severed lines). The stream of TDM traffic 113 is protection switched at node 103. Node 103 informs the other nodes in the ring of the failure. The stream of TDM traffic 113 is transmitted back to node 101 from node 103 in the protection channel 110 of node 103's West span 115. The stream of TDM traffic 113 continues around the ring to node 105 along a protection path. The protection path includes the protection channels 114, 120, 128, and 120 carrying traffic between nodes 101 and 107, 107 and 109, 109 and 111, and 111 and 105 respectively.

FIG. 1c (Prior Art) is a diagram of exemplary traffic flow on the BLSR while there is not a failure. In FIG. 1c, transmit working and protection channels 137, 110 and receiving working and protection channels 119, 139 of node 103's West span 115 are shown. Similarly, transmit working and protection channels 121, 135 and receiving working and protection channels 141, 143 of node 103's East span 117 are shown. The transmit working channel 137 and the receiving protection channel 139 of node 103's West span 115 are not shown in FIGS. 1a and 1b for simplicity. The transmit protection channel 135 and the receiving working channel 141 of node 103's East span 117 are also not shown in FIGS. 1a and 1b for simplicity. A stream of working TDM traffic 104 is transmitted in the transmit working channel 137 from node 103 to node 101. Another stream of working TDM traffic 113 is received in the receiving working channel 119 and transmitted to node 105 in the transmit working channel 121 while there is not a failure. The receive working channel 141 carries TDM traffic not shown in the figure.

FIG. 1d (Prior Art) is a diagram of exemplary traffic flow on the BLSR while there is a failure. In FIG. 1d, the stream of working TDM traffic 104 continues to be transmitted in the transmit working channel 137. The stream of TDM traffic 113 is protection switched to the transmit protection channel 110 while there is a failure.

The ring described in FIGS. 1a–1d can be a 2 fiber or 4 fiber BLSR. The channels described in FIGS. 1a–1d are logical channels which may reside on different optical fibers depending on the ring architecture. A ring switch, which is a protection switch that occurs in both 2 fiber and 4 fiber BLSRs, is illustrated in FIGS. 1c–1d.

FIG. 1e (Prior Art) is a diagram illustrating a span switch for a 4 fiber BLSR while the transmit working channel 121 of FIGS. 1c–1d fails. In FIG. 1e, the transmit working channel 121 of node 103 fails. In a 4 fiber optical ring, the failure is detected and the stream of TDM traffic 113 is span switched to the transmit protection channel 135. A span switch is a protection switch which occurs in a 4 fiber BLSR. Physically, the East span 117 is 2 fibers. The transmit working channel 121 exists on one fiber and the transmit protection channel 135 exists on a separate fiber. The failure of the working channel 121 is a failure of the first fiber. In this example, the two fibers 121 and 133 are in separate conduits. Since the fibers run in separate conduits, a failure caused by severing will not affect both fibers. The stream of TDM traffic 113 is switched from being transmitted over the first fiber to being transmitted over the second fiber.

High speed optical rings offer large amounts of bandwidth, but the protection scheme utilizes at most 50% of that bandwidth. This 50% of maximum possible total bandwidth for a protection channel often goes unused while there is not a failure. It is often unused because traffic transmitted in the protection channel would be preempted by the working TDM traffic while a failure occurs.

FIGS. 2a and 2b are diagrams illustrating the use of a protection channel to carry extra time division multiplexed (TDM) traffic while there is and is not a failure. FIG. 2a (Prior Art) is a diagram illustrating the use of a protection channel to carry extra TDM traffic while there is not a failure. In FIG. 2a, a West span 201 is divided into a working channel 205 and a protection channel 207. The working channel 205 carries TDM traffic 209 and the protection channel 207 carries extra TDM traffic 211. An East span 203 is also divided into a working channel 204 and a protection channel 206. The working channel 204 of the East span 203 carries TI)M traffic 213 and the protection channel 206 carries extra TDM traffic 215.

FIG. 2b (Prior Art) illustrates preemption of extra TDM traffic while there is a failure. In FIG. 2b, the East span 203 has failed. The working TDM traffic 213 is protection switched into the protection channel 207 of the West span 201. The protection switched working TDM traffic 213 preempts the extra TDM traffic 211 which was previously carried in the protection channel 207 of the West span 201. The extra TDM traffic 215 previously transmitted over the protection channel 207 of the East span 203 is not protected and is therefore completely lost upon the failure. The extra TDM traffic is problematic to sell to customers because it is preemptable and unprotected. A consumer could purchase the extra traffic service from two network owners or providers and alternate between the two upon failures. While the above is true for a 2 fiber BLSR, the impact to extra TDM traffic in a 4 fiber BLSR depends on the type of failure. In particular, while a ring switch in 4 fiber BLSR operates in a similar manner as described above, a span switch in a 4 fiber BLSR does not impact the extra TDM traffic transmitted on the non-failing spans.

An alternative to unprotected preemptable traffic in a protection channel is to provide a non-preemptable unprotected traffic (NUT) channel. A NUT channel allows for an implementation that runs a unidirectional path switched ring (UPSR) over a BLSR. Other examples include ATM 1+1 protection schemes which can traverse over the NUT channel. Thus, a NUT channel is used to provide two circuit level protection schemes.

SUMMARY OF THE INVENTION

The invention provides a method and apparatus for provisioning a non-BLSR protected layer 2/3 channel. According to one aspect of the invention, a computer implemented method provides for provisioning a hybrid variable rate pipe on a span of an optical ring and transmitting a set of traffic in the hybrid variable rate pipe.

These and other aspects of the present invention will be better described with reference to the Detailed Description.

BRIEF DESCRIPTION OF THE DRAWINGS

The invention may best be understood by referring to the following description and accompanying drawings that are used to illustrate embodiments of the invention. In the drawings:

FIG. 1c (Prior Art) is a diagram of exemplary traffic flow on the BLSR while there is not a failure.

FIG. 1d (Prior Art) is a diagram of exemplary traffic flow on the BLSR while there is a failure.

FIG. 2a (Prior Art) is a diagram illustrating the use of a protection channel to carry extra TDM traffic while there is not a failure.

FIG. 2b (Prior Art) illustrates preemption of extra TDM traffic while there is a failure.

FIG. 4a is a conceptual diagram illustrating the allocation of bandwidth of an optical fiber according to one embodiment of the invention FIG. 4b is a conceptual diagram of the division of bandwidth according to a paired channel protection scheme in on an optical fiber according to one embodiment of the invention.

FIG. 4c is a conceptual diagram illustrating the allocation of bandwidth of the fiber in accordance with an inverted channel protection scheme according to one embodiment of the invention.

FIG. 7a is a diagram illustrating an example traffic flow while there is not a failure in an optical span according to one embodiment of the invention.

FIG. 7b is a diagram illustrating an example traffic flow while there is a failure in an optical span according to one embodiment of the invention.

DETAILED DESCRIPTION

In the following description, numerous specific details are set forth to provide a thorough understanding of the invention. However, it is understood that the invention may be practiced without these specific details. In other instances, well-known protocols, circuits, structures and techniques have not been shown in detail in order not to obscure the invention.

According to one embodiment of the invention, one or more non-BLSR protected channels is added to a ring to carry Layer 2/3 TDM traffic (referred to herein as a non-BLSR protected Layer 2/3 channel). The term channel is used herein in a context specific manner. For instance, the term channel is used herein to refer to a physical channel on a fiber. However, the use of the term channel is also used to refer to the higher level constructs of a non-BLSR protected Layer 2/3 channel, a working channel, and a protection channel, which can each refer to groupings of one or more physical channels on a fiber. In this ring network, network elements are used that can transmit and receive TDM ring traffic. In addition, at least certain of the network elements (referred to herein as hybrid network elements) provide two different switching techniques—TDM and packet. The packet switching provided can support any number of protocols including layer 2 and layer 3 type protocols such as ATM, Ethernet, Frame Relay, IP, etc. In addition to typical operations of a TDM network element, the hybrid network elements are implemented to be able to: 1) programmably select on an STS basis certain of the incoming TDM traffic to be extracted and packet switched rather than TDM switched; and/or 2) receive packet traffic in another form to be packet switched. Regardless of which switching technique is used, the switched traffic going back onto the ring is put in TDM format and transmitted out. However, each time traffic is packet switched, that traffic can be statistically multiplexed. An exemplary implementation of such hybrid network elements is provided herein with reference to FIG. 10.

The term Layer 2/3 TDM traffic is used herein to refer to traffic that is in some packet based form (e.g., Ethernet, IP, ATM, IP, etc) that: 1) can be extracted from the Layer 1 TDM format used to carry the Layer 2/3 TDM traffic on the spans; and 2) can be switched on a packet basis by the hybrid network elements described above.

The non-BLSR protected Layer 2/3 channel is configured to be the same width around the entire ring. While it is not necessary, in one embodiment a single non-BLSR protected Layer 2/3 channel is configured on a given ring. In addition, while it is not necessary, in one embodiment, the traffic to be carried on the non-BLSR protected layer 2/3 channel must enter and be terminated through a packet switch of a hybrid network element to allow for compatibility with existing BLSR network elements as described later herein.

Figure 3A:
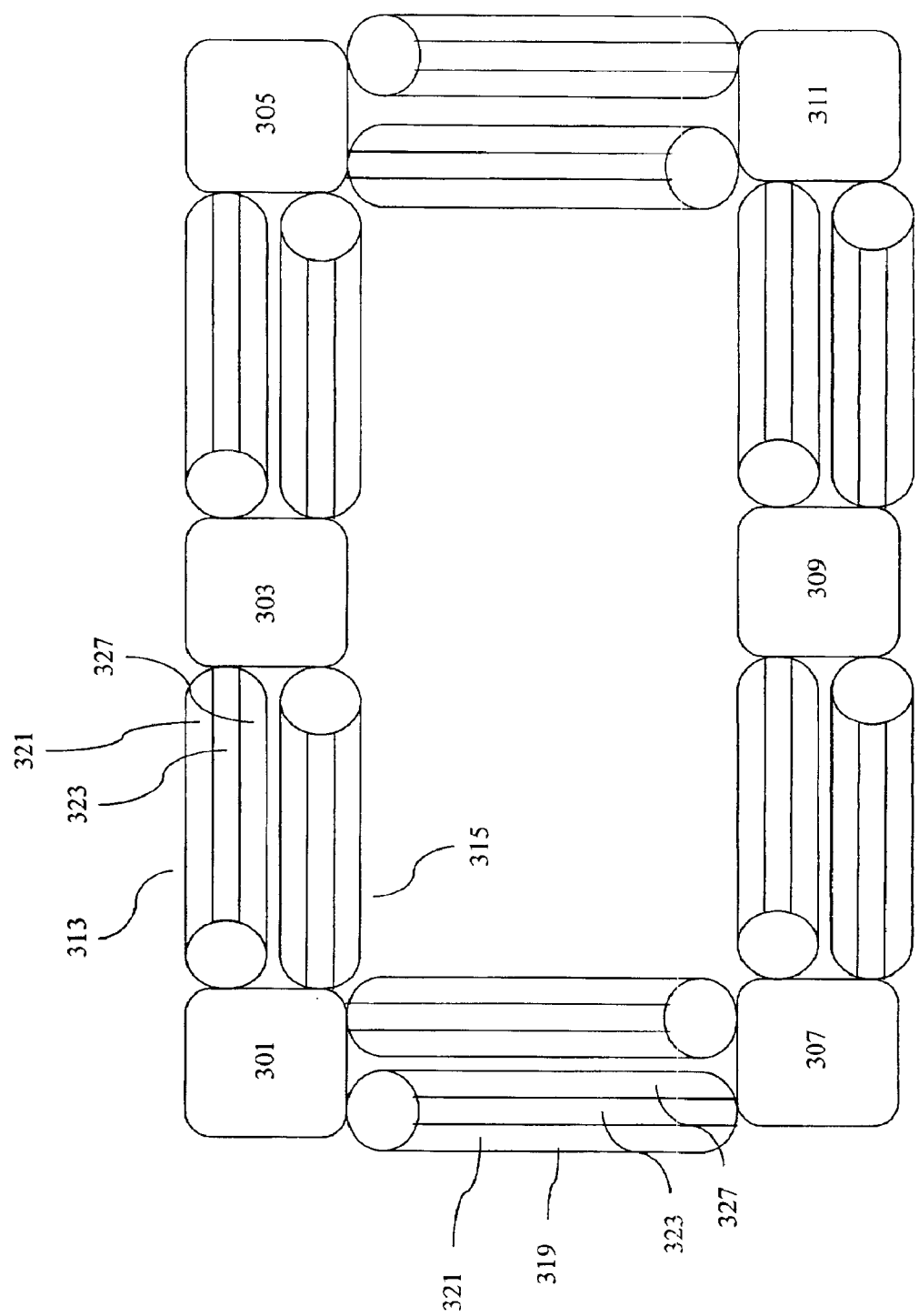
FIG. 3a is a conceptual diagram of the bandwidth of an optical ring divided into channels according to one embodiment of the invention.

FIGS. 3a–3d illustrate traffic flow in response to a failure in a ring with a non-BLSR protected Layer 2/3 channel according to one embodiment of the invention. FIG. 3a is a conceptual diagram of the bandwidth of an optical ring divided into channels according to one embodiment of the invention. The optical ring illustrated in FIG. 3a is a six node BLSR. Each node 301, 303, 305, 307, 309, and 311 in the ring has an East and West span. Each span includes a transmit fiber and a receive fiber. From node 301's perspective, 313 is its East transmit fiber. The bandwidth for each fiber is divided into three channels: a working channel 321, a protection channel 327, and a non-BLSR protected Layer 2/3 channel 323. The protection channel 327 is to protect the working channel 321 of 301's West transmit fiber 319. Similarly, the West transmit fiber's 319 protection channel 327 protects the working channel 321 of node 301's East transmit fiber 313. According to one exemplary use, TDM traffic is transmitted over the working channel 321, while Layer 2/3 TDM traffic (e.g. cells, packets, etc.) is transmitted over the non-BLSR protected Layer 2/3 channel 323.

Figure 3B:
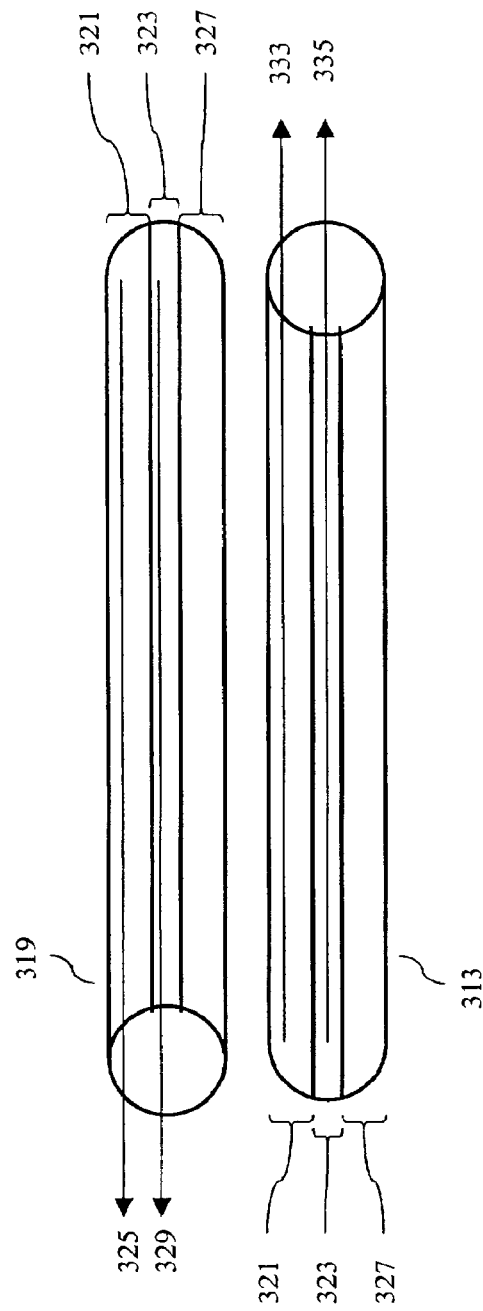
FIG. 3b is a diagram illustrating traffic flow with a non-BLSR protected Layer 2/3 channel of the East and West transmit fibers 313 and 319 of FIG. 3a whenever there is no failure on the ring according to one embodiment of the invention.

FIG. 3b is a diagram illustrating traffic flow with a non-BLSR protected Layer 2/3 channel of the East and West transmit fibers 313 and 319 of FIG. 3a whenever there is no failure on the ring according to one embodiment of the invention. TDM traffic 325 is being transmitted over the working channel 321 of the West transmit fiber 319. Non-BLSR protected Layer 2/3 TDM traffic 329 is being transmitted over the non-BLSR protected Layer 2/3 channel 323 of the West transmit fiber 319. In this illustration, the protection channel 327 of the West transmit fiber 319 is idle, but extra TDM traffic can be carried over the protection channel 327. East flowing TDM traffic 333 is transmitted over the working channel 321 of the East transmit fiber 313. Non-BLSR protected Layer 2/3 TDM traffic 335 is being transmitted over the non-BLSR protected layer 2/3 channel 323 of the East transmit fiber 313. In this example, the protection channel 327 of the East transmit fiber 313 is idle, but the protection channel of the East transmit fiber 313 can carry extra TDM traffic.

Figure 3C:
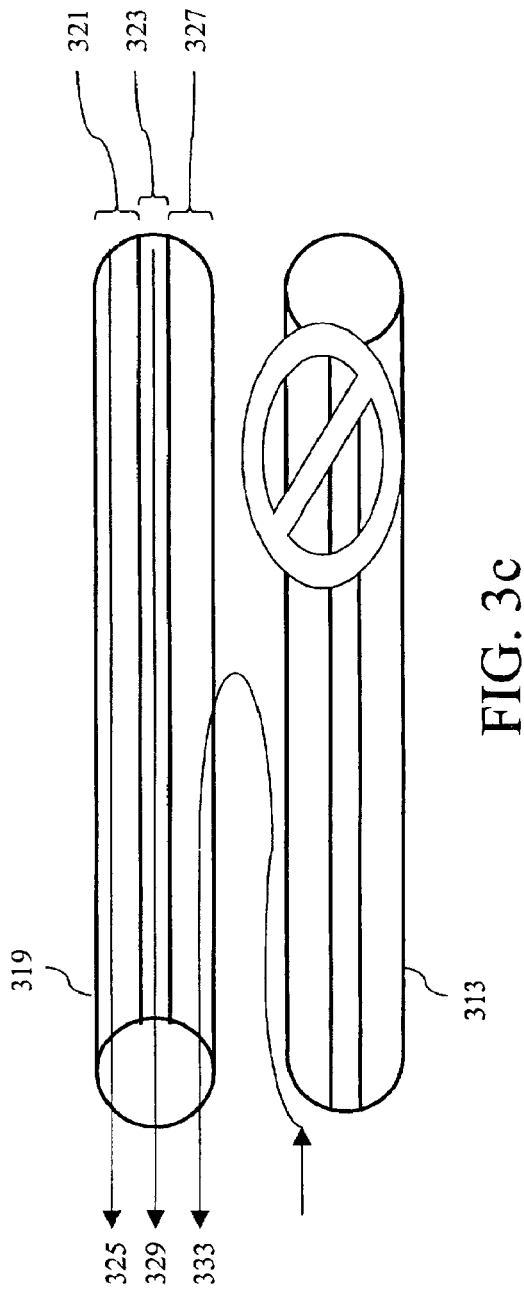
FIG. 3c is a diagram illustrating an example of traffic flow while there is a failure in the ring according to one embodiment of the invention.

FIG. 3c is a diagram illustrating an example of traffic flow while there is a failure in the ring according to one embodiment of the invention. In this example, the East transmit fiber 313 has failed (e.g., broken line). The West transmit fiber 319 now carries three flows of traffic. The previously East flowing TDM traffic 333 is protection switched to the protection channel 327 of the West transmit fiber 319. The working channel 321 of the West transmit fiber 319 continues to carry the West flowing TDM traffic 325. The non-BLSR protected Layer 2/3 channel 323 continues to carry the West flowing non-BLSR protected Layer 2/3 TDM traffic 329. The protection channel 327 of the West transmit fiber 319 is no longer idle and now carries the previously East flowing TDM traffic 333. If the protection channel 327 of the West transmit fiber 319 carried extra TDM traffic, that extra TDM traffic is dropped over the entire ring. Also note that because the non-BLSR protected layer 2/3 TDM traffic 335 is not protected by BLSR, it will be dropped and/or protected by another higher level mechanism as described later herein.

Figure 3D:
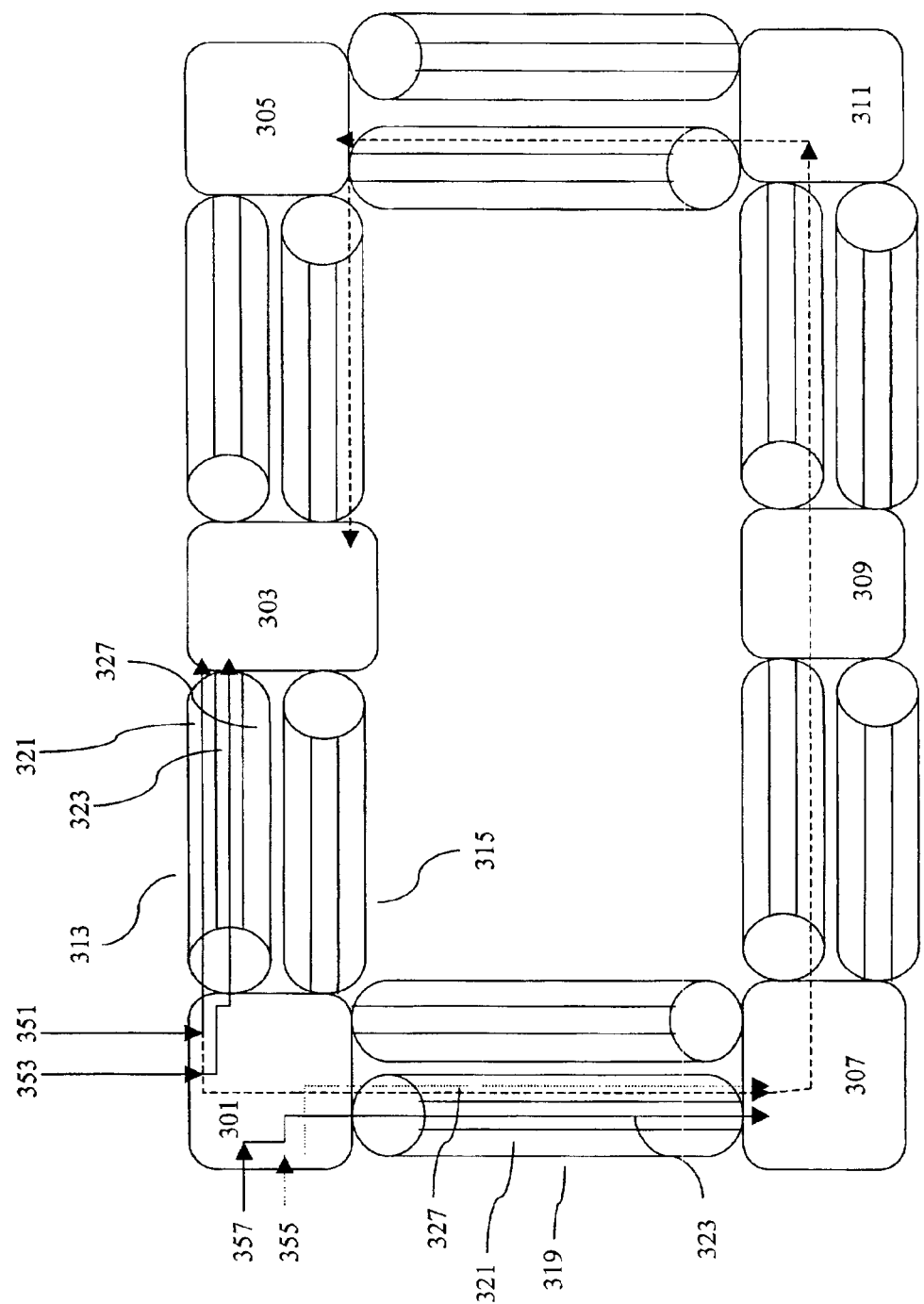
FIG. 3d is a diagram of exemplary traffic flow whenever there is and is not a failure in the six node ring illustrated in FIG. 3a having a non-BLSR protected layer 2/3 channel and carrying extra TDM traffic according to one embodiment of the invention.

FIG. 3d is a diagram of exemplary traffic flow whenever there is and is not a failure in the six node ring illustrated in FIG. 3a having a non-BLSR protected layer 2/3 channel and carrying extra TDM traffic according to one embodiment of the invention. In FIG. 3d, TDM traffic 351 and extra TDM traffic 355 enter the BLSR through node 301. TDM traffic 351 is transmitted to node 303 over the working channel 321 of node 301's East transmit fiber 313. The extra TDM traffic 355 is transmitted from node 301 to node 307 on the protection channel 327 of node 301's West transmit fiber 319. Two flows of Layer 2/3 TDM traffic 353, 357 also enter the BLSR through node 301. In one embodiment, layer 2/3 TDM traffic must be switched through a packet mesh when entering and exiting the ring. Layer 2/3 TDM traffic 353 is transmitted over the non-BLSR protected channel 323 of node 301's East transmit fiber 313 to node 303 where it exits the ring. Layer 2/3 TDM traffic 357 is transmitted over the non-BLSR protected layer 2/3 channel 323 of node 301's West transmit fiber 319 to node 307. The layer 2/3 traffic 353, 357 does not necessarily come from the same input port on a line card. The traffic 353, 357 can arrive on any port on any line card in node 301 as long as some switching mechanism (e.g., packet switching, frame switching, etc.) directs the incoming layer 2/3 traffic to the East or West bound channel 323.

If the East transmit fiber 313 fails, the TDM traffic 351 is protection switched to the protection channel 327 of node 301's West transmit fiber 319. Any traffic being transmitted over the counter-clockwise protection path of the ring, including the extra TDM traffic 355 is preempted by the TDM traffic 351. In contrast, only the layer 2/3 TDM traffic 353 is dropped from the perspective of typical BLSR protection (other protection may be provided as described later herein). The other non-BLSR protected layer 2/3 channels are unaffected by the span failure. Hence, the layer 2/3 TDM traffic 357 is unaffected by the failure of node 301's East transmit fiber 313.

Since a segment of the bandwidth of a ring is allocated to a non-BLSR protected layer 2/3 channel, more of the ring bandwidth can be utilized after a span failure in the ring. Typically, a failure results in losing OC-n of ring traffic (if the ring is carrying extra TDM traffic), where n is half the ring's total bandwidth. The amount of bandwidth lost due to a failure decreases in proportion to the amount of bandwidth allocated to a non-BLSR protected layer 2/3 channel.

The addition of the non-BLSR protected Layer 2/3 channel enables a provider to deliver up to three types of services. Firstly, the provider can provide typical guaranteed service for TDM traffic. Secondly, the provider can provide the protection channel to carry preemptable extra TDM traffic. Thirdly, the provider can provide the non-BLSR protected Layer 2/3 channel to carry Layer 2/3 TDM traffic. It should be noted that the second service is not provided without the first, but that the first and third are independent and either could be the only service existing on the ring at a given time. Thus, according to one aspect of the invention, a ring architecture is described that can be operated as a BLSR ring for TDM traffic (e.g., telecom traffic), a set of routers (e.g., for data traffic), or both. The hybrid network elements on the ring can therefore be viewed as part of a TDM ring, a packet network, or both (e.g., a typical IP router can interact with one of the hybrid network elements as a TDM network element or as a packet network element.) This is in contrast to prior art network architectures in which a network element can be either TDM or packet, but not both. Thus, this aspect of the invention provides a more versatile, cost effective architecture. It should also be noted that the selection of how the hybrid network elements are configured to carry traffic (TDM, packet, or both) can be changed over time to meet requirements for more, less, or no traffic of one or the other type. The change can be dynamically determined by monitoring traffic patterns over the network. Exemplary techniques for implementing the non-BLSR protected layer 2/3 channel in the hybrid network elements are described later herein with reference to FIG. 10.

Time Slot Allocation

Two-Fiber BLSR

In standard two-fiber BLSR, the fiber is split in half in the sense that the "upper" half of the channels are working and the "lower" are protecting. In particular, the working time slot X is protected by protection time slot X+N/2, where 1<=X<=N/2 and N is the total number of timeslots in the fiber.

FIGS. 4a–4c are conceptual diagrams illustrating allocation of timeslots over an optical ring according to various embodiments of the invention. FIG. 4a is a conceptual diagram illustrating the allocation of bandwidth of an optical fiber according to one embodiment of the invention. FIG. 4a corresponds to the example configuration of timeslots shown in Table 1.

TABLE 1

Configuration of Timeslots for channels

| Channels | Timeslots |
| --- | --- |
| non-BLSR protected layer 2/3 | 1 |
| non-BLSR protected layer 2/3 | ... |
| non-BLSR protected layer 2/3 | N/2 − 1 |
| Working | N/2 |
| non-BLSR protected layer 2/3 | N/2 + 1 |
| non-BLSR protected layer 2/3 | N − 1 |
| Protection | N |

In Table 1, timeslot N/2 is configured as the working channel 403. Timeslot N is configured as a protection channel 405. Timeslots 1 through N/2−1 and timeslots N/2+1 through N−1 are configured as non-BLSR protected Layer 2/3 channel 401. Thus, the scheme of Table 1 remains true to the standard BLSR working and protecting channel split. As a result, non hybrid typical TDM elements can be put on the ring—i.e. compatibility exists between hybrid and non-hybrid TDM elements on the BLSR.

With reference to FIG. 4a and Table 1, the time slots allocated to the non-BLSR protected layer 2/3 channel are not contiguous, and therefore cannot be concatenated by the prior art. However, another aspect of the invention provides for fragmented concatenations. Such fragmented concatenations allow for the logical concatenation of time slots that are not physically contiguous. Specifically, whereas in standard BLSR the concatenations are indicated in the SONET frames and are limited to physically contiguous STSs, another aspect of the invention is the inclusion in the hybrid network elements the ability to be configured in a manner that allows the programming of fragmented concatenations. Thus, at the time the non-BLSR protected layer 2/3 channel is set up around the ring, the fragmented concatenations are programmed in the hybrid network elements of the ring.

With respect to Table 1, the fragmented concatenations allow the hybrid network elements to treat the non-BLSR layer 2/3 time slots as being a single concatenation even though they are separated by the protection channel. This allows a single large pipe to be formed for the non-BLSR protected layer 2/3 channel as in FIGS. 4a and 4b, while still allowing for conformity with the existing BLSR standard. As a result, a non-hybrid TDM network element, supporting non-preemptable unprotected channels, could be inserted into the ring (the only limitation is that the non-BLSR protected layer 2/3 TDM traffic cannot enter or exit the ring at the non-hybrid TDM network element; that traffic must only pass through). Exemplary techniques for implementing the fragmented concatenations in the hybrid network elements are described later herein with reference to FIG. 10. A more detailed description of fragmented concatenations can be found in a patent application titled "Any Size and Location of Concatenated Packet Data Across Sonet Frames in a Sonet Signal" to Anurag Nigam and David Stiles, filed on Dec. 29, 2000, Ser. No: 09/751,764, which is hereby incorporated by reference.

Providing a single large pipe for layer 2/3 TDM traffic through concatenations increases the efficiency of transmission and management of the Layer 2/3 TDM traffic. A single large pipe also simplifies the task of processing variable length packets.

Two exemplary alternative mechanisms for achieving single concatenated channels are referred to herein as inverted and paired channel protection schemes. Neither is in conformance with standard BLSR.

FIG. 4b is a conceptual diagram of the division of bandwidth according to a paired channel protection scheme on an optical fiber according to one embodiment of the invention. In FIG. 4b, the bandwidth of an East transmit fiber 410 is divided between a non-BLSR protected Layer 2/3 channel 401, a working channel 403 and a protection channel 405. The division of bandwidth of the East transmit fiber 410 corresponds to the example configuration of timeslots illustrated by Table 2. Table 2 shows timeslot 1 configured as the working channel 403 and timeslot 2 configured as the protection channel 405.

TABLE 2

Configuration of Timeslots for channels

| Channels | Timeslots |
| --- | --- |
| Working | 1 |
| Protection | 2 |
| non-BLSR protected layer 2/3 | 3 |
| non-BLSR protected layer 2/3 | 4 |
| non-BLSR protected layer 2/3 | ... |
| non-BLSR protected layer 2/3 | ... |
| non-BLSR protected layer 2/3 | N |

In Table 2, timeslots 3 through N (N being the total number of timeslots) are configured as the non-BLSR protected Layer 2/3 channel 401.

FIG. 4c is a conceptual diagram illustrating the allocation of bandwidth of the fiber in accordance with an inverted channel protection scheme according to one embodiment of the invention. The bandwidth allocation illustrated by FIG. 4c corresponds to the example configuration of timeslots shown in Table 3.

TABLE 3

Configuration of Timeslots for channels

| Channels | Timeslots |
| --- | --- |
| Working | 1 |
| non-BLSR protected layer 2/3 | 2 |
| non-BLSR protected layer 2/3 | ... |
| non-BLSR protected layer 2/3 | ... |
| non-BLSR protected layer 2/3 | ... |
| non-BLSR protected layer 2/3 | N − 1 |
| Protection | N |

In Table 3, timeslot 1 is configured as the working channel 403. Timeslot N is configured as the protection channel 405. Timeslots 2 through N−1 are configured as the non-BLSR protected Layer 2/3 channel 401.

Four-Fiber BLSR

In 4 fiber BLSR, two non-BLSR protected layer 2/3 channels are provisioned over the ring as in 2 fiber BLSR conforming to standard BLSR time slot allocation. One non-BLSR protected layer 2/3 channel is provisioned on the fiber with the working channel. The other non-BLSR protected layer 2/3 channel is provisioned on the fiber with the protection channel. In one embodiment of the invention, traffic is concatenated for each non-BLSR protected layer 2/3 channel. In another embodiment, fragmented concatenation can be extended for utilization in 4 fiber BLSR.

Furthermore, a load balancing mechanism (e.g., ATM SAR, multi-link PPP, etc.) would be implemented in a 4 fiber BLSR to balance traffic transmitted over a channel spanning multiple fibers.

The allocation of bandwidth for channels can be adjusted to service demand. If TDM traffic is the dominant traffic on the carrier's network, then a larger number of timeslots will be configured for working and protection channels. If layer 2/3 TDM traffic dominates the carrier network, then more timeslots will be configured for the non-BLSR protected Layer 2/3 channel.

Exemplary Techniques for Protecting the Non-BLSR Protected Layer 2/3 Channel Traffic Although the non-BLSR Layer 2/3 channel is not protected by standard BLSR, there are a number of different ways in which the non-BLSR Layer 2/3 channel traffic can be protected. For example, in one embodiment, the Layer 2 or 3 forms of protection can be relied upon. If Layer 3 protection by routing protocols is relied upon, it should be understood that the response time for a protection switch will be significantly longer than the reaction time of standard BLSR. The routing protocols will discover the failure and route traffic around it. Typically, detection of a failure is done with time-outs. However, it is possible for the layer 1 SONET protocol to notify the layer 3 routing protocol of failures, greatly improving the speed at which layer 2/3 recover is done. While one embodiment relies on standard Layer 2 and/or 3 forms of protection, alternative embodiments of the invention rely on other types of protection that achieve the speed of the protection switch provided by standard BLSR.

In one embodiment in which all the network elements in the ring need not be hybrid network elements, the hybrid network elements on the ring are configured to have a corresponding multiprotocol label switching (MPLS) tunnel for the traffic on the non-BLSR protected Layer 2/3 channel that is to be "Layer 2/3 BLSR protected." Based on a failure being identified by the BLSR section of the hybrid network elements, the layer 2/3 section of the network elements sharing the span on which the failure occurred switch to forward out the preconfigured MPLS tunnels. Since the tunneled traffic is statistically multiplexed with traffic in the non-BLSR protected layer 2/3 channel, the protecting tunnels may be preconfigured, but they still follow standard BLSR routes through the ring.

Figure 3E:
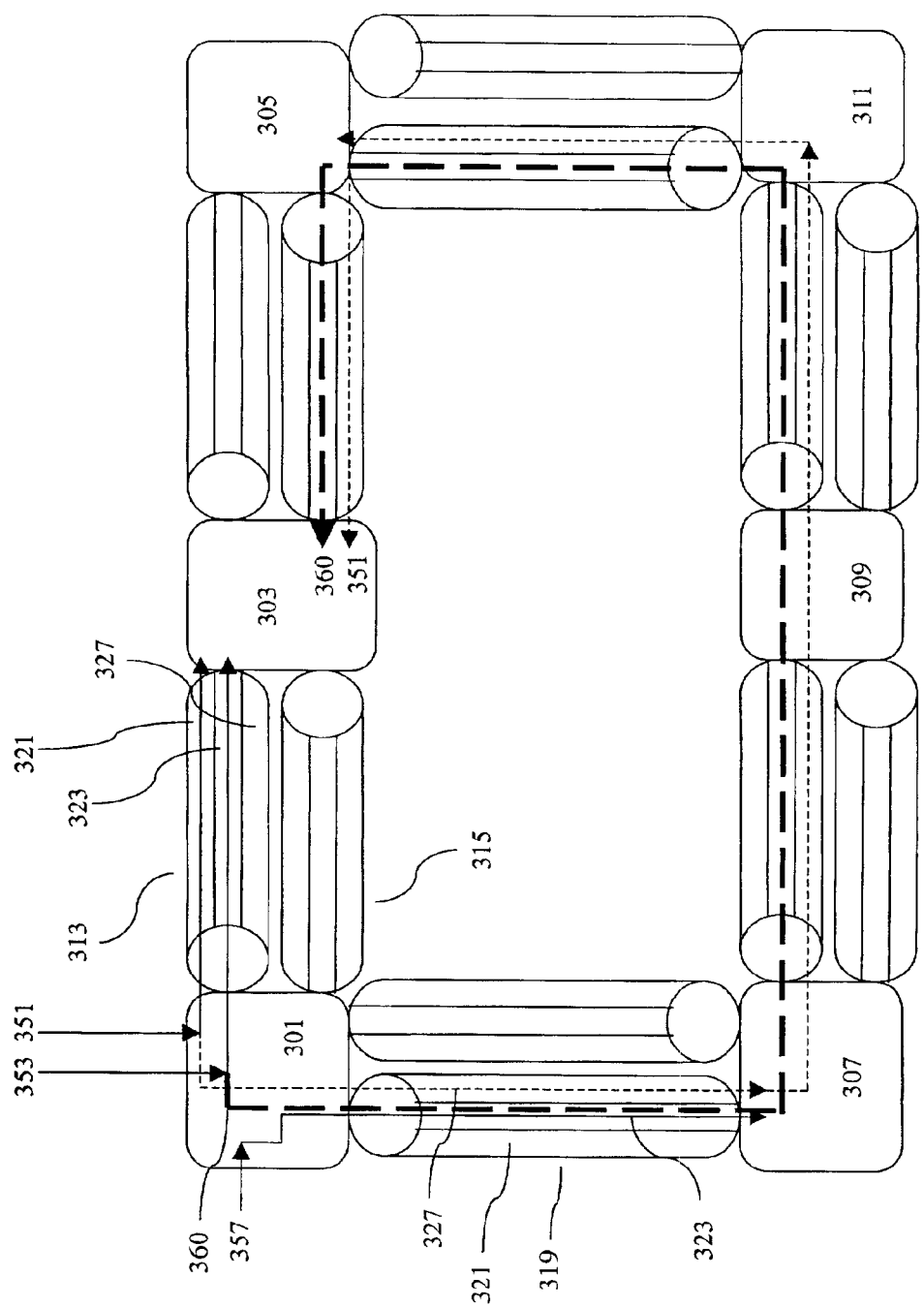
FIG. 3e is a diagram of exemplary traffic flow while there is and is not a failure in the six node ring illustrated in FIG. 3a wherein a non-BLSR protected Layer 2/3 channel is protected using Layer 2/3 BLSR protection according to one embodiment of the invention.
Figure 5:
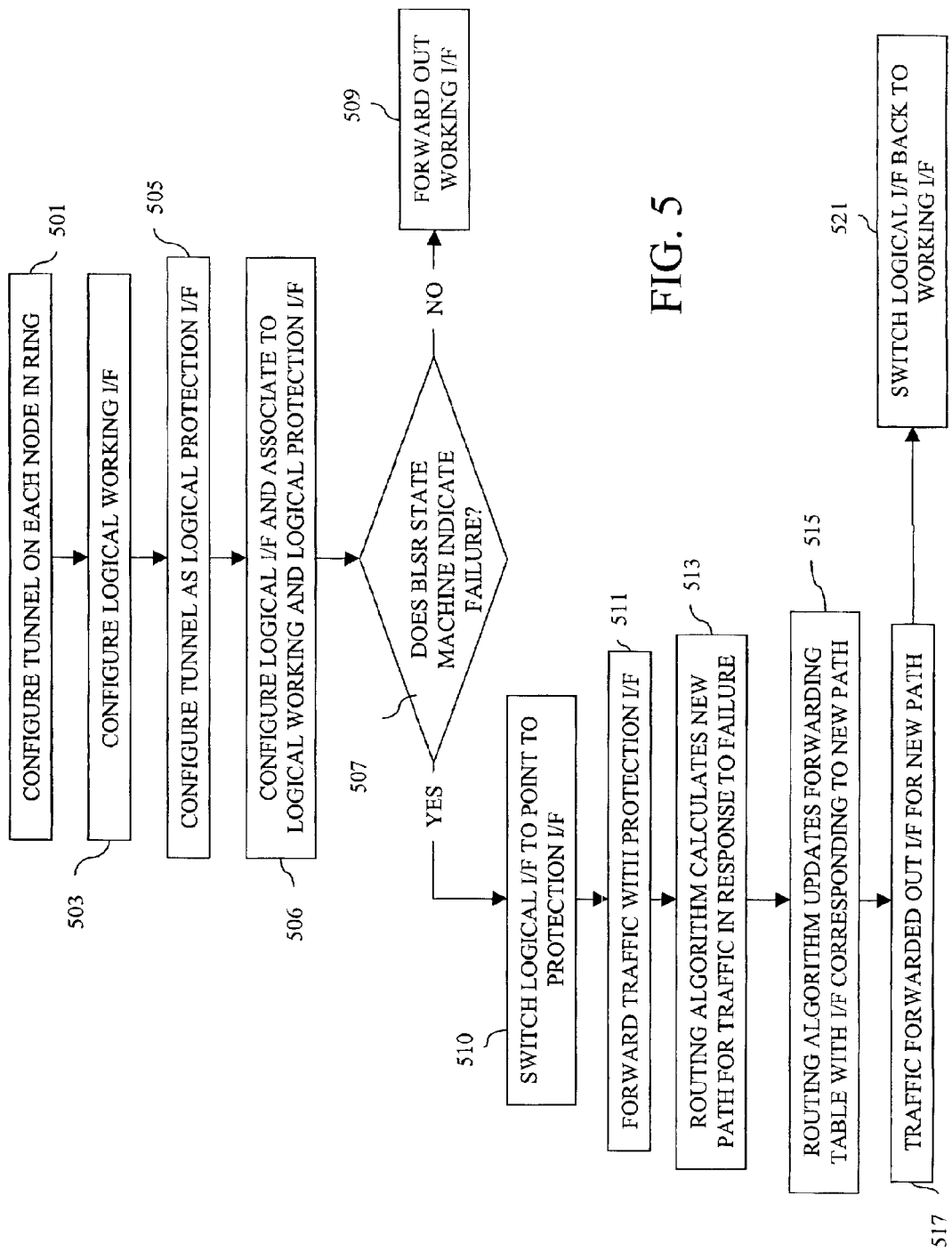
FIG. 5 is a flowchart for providing an alternative path for protecting non-BLSR protected Layer 2/3 TDM traffic in BLSR protection time using Layer 2/3 BLSR protection according to one embodiment of the invention.

FIG. 5 is a flowchart for providing an alternative path for protecting non-BLSR protected Layer 2/3 TDM traffic in BLSR protection time using Layer 2/3 BLSR protection according to one embodiment of the invention. FIG. 3e is a diagram of exemplary traffic flow while there is and is not a failure in the six node ring illustrated in FIG. 3a wherein a non-BLSR protected Layer 2/3 channel is protected using Layer 2/3 BLSR protection according to one embodiment of the invention. FIG. 3e shows generally the same elements as FIG. 3d, with the exception of a tunnel 360 described below. FIG. 5 and 3e will be described together.

At block 501, a tunnel is configured on each network element in an optical ring. With reference to FIG. 3e, the system is configured to transmit layer 2/3 traffic 353 from node 301 to node 303 over the non-BLSR protected channel 323 of node 301's West transmit fiber 319. In this example, the layer 2/3 traffic 353 exits the ring to an external network element at node 303. A tunnel 360 is configured to travel through the non-BLSR protected channel 323 around the ring in the opposite direction to terminate in node 303. In one embodiment, this tunnel is configured as an MPLS tunnel because MPLS tunnels can be configured to have variable bandwidth (that is the pipe size maximum can be entered, but the pipe will only take what bandwidth is needed from zero up to the maximum).

At block 503, a logical working interface is configured on one of the network elements of the ring and associated to a physical interface. Typically an interface is synonymous with a physical port. A logical interface is an abstraction or data structure representation of the physical port. Multiple logical interfaces can be associated to a single physical port. With reference to FIG. 3e, the logical working interface on node 301 is configured for the layer 2/3 traffic 353 to forward it to the physical port for node 301's east transmit fiber 313.

At block 505, the previously configured tunnel is configured as a logical protection interface on the network element. With reference to FIG. 3e, a logical protection interface on node 301 is configured for the layer 2/3 traffic 353 to forward it to the tunnel configured on the physical port for node 301's west transmit fiber 319.

At block 506, a logical interface is configured and associated to the logical working interface and logical protection interface. The logical interface is initially configured to point to the logical working interface.

At block 507, the network element determines if a failure has been detected on the fiber coupled to the physical interface. If a failure is not indicated by a BLSR state machine, then at block 509 traffic is forwarded with the logical working interface as usual. If a failure is indicated by the BLSR state machine, then at block 510, the logical interface is switched from the logical working interface to the logical protection interface. With reference to FIG. 3e, the logical interface is switched to the protection interface so that the layer 2/3 traffic 353 is forwarded out the tunnel 360 over node 301's west span. As such, the layer 2/3 traffic 353 is protection switched using layer 2/3 BLSR protection at the speed of standard BLSR, without using standard BLSR. In addition, the tunnel 360 is statistically multiplexed with the layer 2/3 TDM traffic 357 being transmitted over the non-BLSR protected layer 2/3 channel 323 on node 301's west span 319.

Thus, in an embodiment in which a variable size MPLS tunnel is used, when there is no failure the tunnel is of size zero and the full bandwidth of the non-BLSR protected layer 2/3 channel on node 301's west span 319 is available for the layer 2/3 TDM traffic 357. However, on a failure, that bandwidth is shared with the tunnel 360 via the statistical multiplexing provided by the packet switching mechanism.

At block 511 the network element forwards traffic through the logical protection interface which is the tunnel. Since the non-BLSR protected layer 2/3 channel carries more traffic while there is a failure then while there is not a failure, a mechanism is implemented in certain embodiments to allocate the bandwidth. In one embodiment, a fairness scheme is implemented (e.g., so that 60% of the tunneled traffic is high priority traffic and 60% of the non-tunneled traffic is high priority). In another embodiment, a priority scheme would place a limit on the amount of tunneled traffic or non-tunneled traffic transmitted over the non-BLSR protected layer 2/3 channel when a failure occurs. In another embodiment of the invention, the tunneled and non-tunneled traffic are treated equally with respect to the physical bandwidth. In such an embodiment, if congestion occurs, then a determination to transmit is made or a packet by packet basis. This determination is made based upon priority indicated by each packet.

At block 513, a routing protocol calculates a different path for the traffic due to the failure. After a new path is calculated, the forwarding table(s) of the network element and/or a different network element is updated at block 515. With reference to FIG. 3e, the forwarding tables in the nodes 301, 307, 309, 311, and 305 may be updated to provide the layer 2/3 TDM traffic 353 to the node 303. Alternatively, the forwarding tables in network elements external to the ring may be updated to transmit the layer 2/3 TDM traffic to the node 303 over a route that does not include the ring of FIG. 3e.

At block 517, traffic is forwarded to a new interface based on the table update performed at block 515.

Figure 1A:
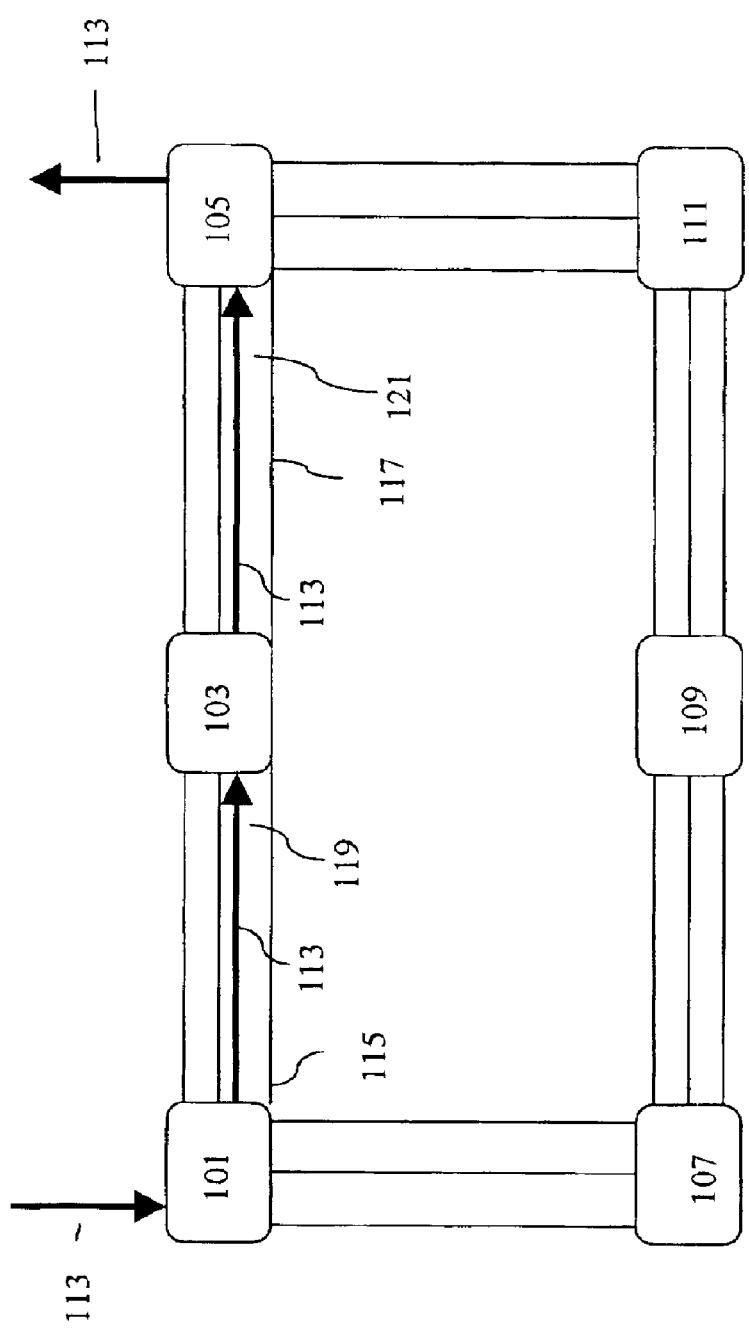
FIG. 1a (Prior Art) is a diagram of exemplary traffic flow on a BLSR while there is not a failure.
Figure 1B:
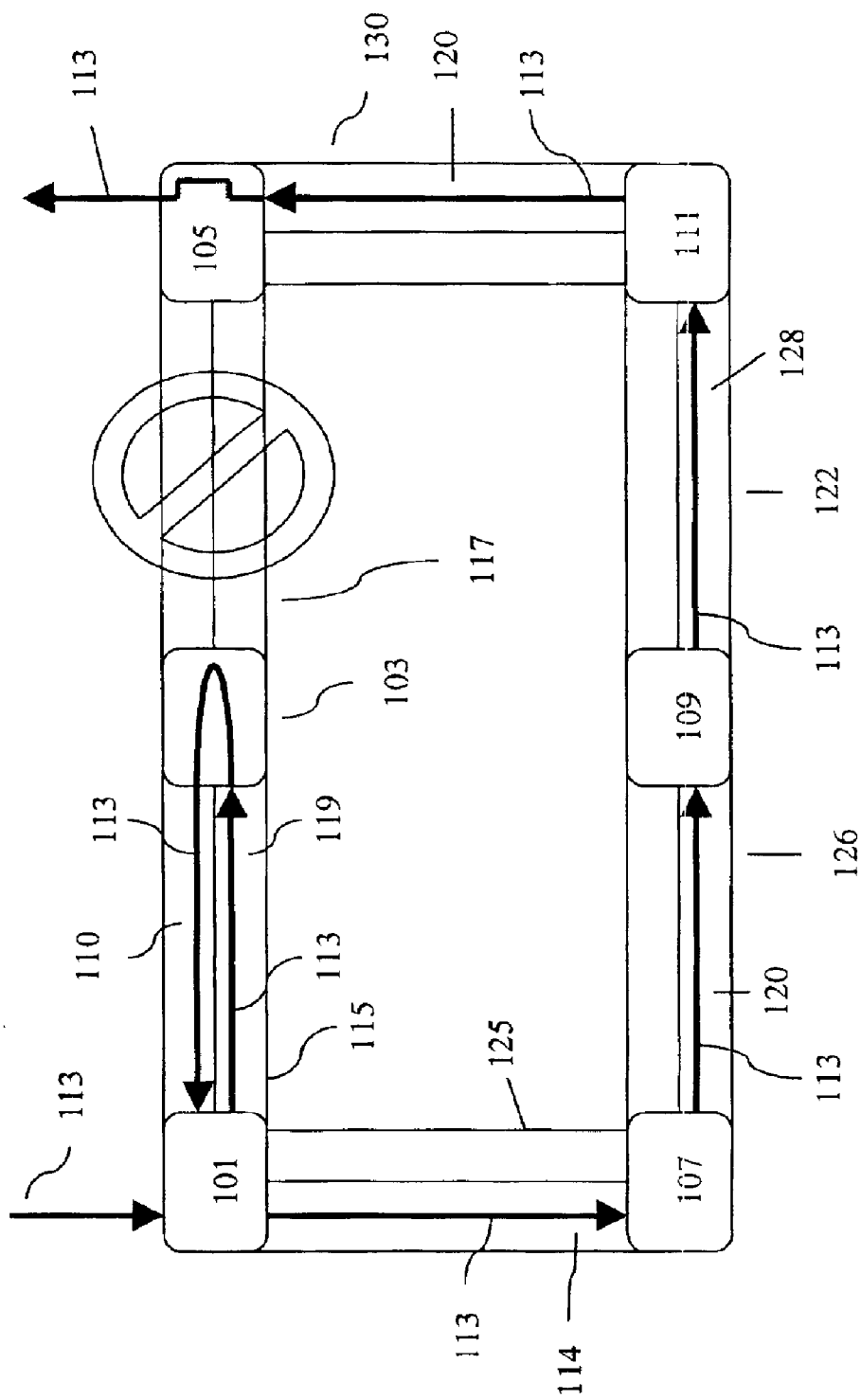
FIG. 1b (Prior Art) is a diagram of exemplary traffic flow on the BLSR while there is a failure.
Figure 1E:
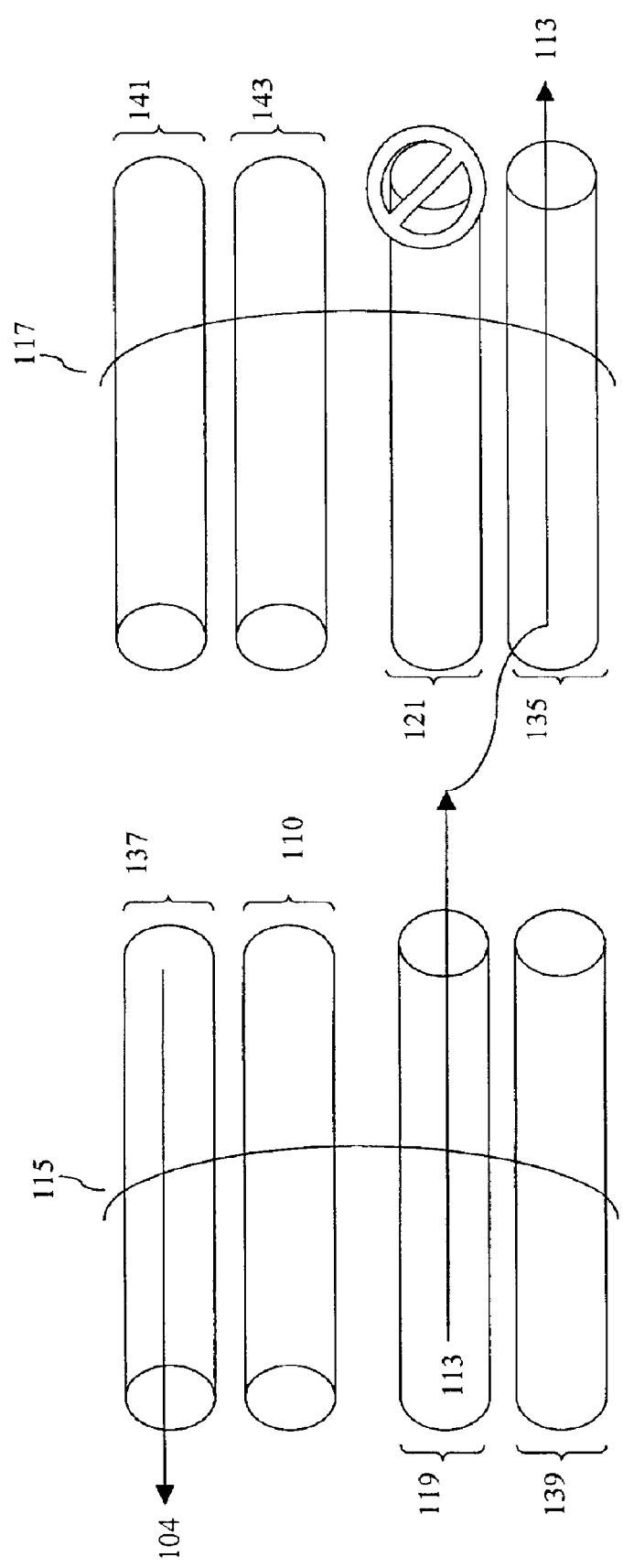
FIG. 1e (Prior Art) is a diagram illustrating a span switch for a 4 fiber BLSR while the transmit working channel 121 of FIGS. 1c–1d fails.

At block 521 the network element switches the logical interface back to the logical working interface. Block 521 can be implemented to be performed responsive to a number of different stimuli (e.g., 1) a correction of the failure; 2) a predetermined amount of time [typically the time expected to be required for blocks 511–515 to be completed; 3) detection that traffic is no longer being sent over the tunnel [indicating that the blocks 511–515 have been completed], etc.). With reference to FIG. 1e, the logical interface is switched back to the working interface; therefore, if and when traffic is sent to the logical interface, it will be transmitted out the working interface over the non-BLSR protected layer 2/3 channel of node 301's east span 313. As such, the tunnel traffic will drop down to zero. Thus, in an embodiment using a variable MPLS tunnel, the bandwidth used by the tunnel will shrink back to zero.

After the failure is corrected (e.g., the fiber is restored, fiber replaced, etc.), the routing protocol will determine that a better path available, the better path being the original path. The network elements will converge and the forwarding tables will be updated. Since the original path was the best path, then the logical interface on node 301 should be the interface to the node 303.

In one embodiment of the invention, a data structure indicates a tunnel and the parameters for the tunnel. A second data structure indicates a physical interface and the physical parameters for the interface. A third data structure indicates a logical interface and stores a pointer to the second data structure and a pointer to the tunnel data structure. Traffic is processed with the logical interface which initially follows the pointer to the second data structure. When the BLSR state machine indicates a failure, the network element will activate the tunnel structure pointer in the logical working interface. Traffic forwarded through the logical interface will be processed with the data stored in the tunnel data structure. The tunnel would of course run opposite the direction of the ring failure.

In another embodiment of the invention, a data structure would be indexed by the logical interface identifier. The logical interface would index a tunnel name, a physical interface, and a protection bit. Traffic to be forwarded through the logical interface would be processed with the data associated to the physical interface. Upon a ring failure, the network element would switch the projection bit. Traffic to be forwarded through the logical interface would now be processed with the data associated to the tunnel name because the protection bit indicates a failure in the working interface channel. These illustrations are intended to aid in the understanding of the invention and not meant to be limiting upon the invention.

In another embodiment, rather than using tunnels, the forwarding tables for the packet switch in each of the hybrid network elements on the ring include failure mode entries in addition to the typical forwarding entries (normal mode entries). Based on a failure being identified by the BLSR section of the hybrid network elements, the layer 2/3 section of the network elements switch to the failure mode entries. When the failure is corrected, the layer 2/3 section of the network element switches back to the normal mode entries.

In an embodiment of the invention, a ring is formed from hybrid network elements, as well as network elements which appear as regenerators at layer 2 and layer 3, but appear as participants in the BLSR ring at layer 1. The hybrid network elements manage layer 2/3 forwarding tables and a cross-connect table which interact. The layer 2/3 forwarding tables reference working interfaces and protecting interfaces. The non-hybrid network elements manage cross connect tables. When there is no failure, traffic may be switched through the packet mesh of a hybrid network element and transmitted as TDM traffic through the cross connect of a non-hybrid network element. In one embodiment of the invention, while there is a failure, the hybrid network elements update their cross connect tables and their layer 2/3 forwarding tables. In another embodiment of the invention, while there is a failure, the hybrid network elements update logical interfaces and their cross connect tables. The non-hybrid network elements update their cross connect tables. Protection switched traffic may be transmitted through the packet mesh to a protection interface in hybrid network elements adjacent to the failure, but pass through the cross connect on the protection channel of non-hybrid network elements and mid-span hybrid network elements. It should be understood that for various reasons, a hybrid network element may be programmed to behave as a non-hybrid network element in certain environments.

The owner of the ring can provide multiple services with the tunnel protected non-BLSR protected layer 2/3 channel. The owner of the ring can offer the bandwidth allocated to the non-BLSR protected layer 2/3 channel as a maximum bandwidth and a guaranteed bandwidth in accordance with a priority scheme. The owner of the ring can implement a priority scheme to support a guaranteed bandwidth of half the non-BLSR protected layer 2/3 channel, 20% of the non-BLSR protected layer 2/3 channel, etc.

Additional Embodiments that Provide Different Types of Service

Having described a non-BLSR protected layer 2/3 channel, another aspect of the invention is the configuring a non-BLSR protected layer 2/3 channel and a variable rate layer 2/3 pipe on a single physical optical ring. In order to describe this, the configuring of just a variable rate layer 2/3 pipe on a BLSR will first be discussed. This will be followed by a description of the configuring of both a non-BLSR protected layer 2/3 channel and a variable rate layer 2/3 pipe on the same physical optical ring.

A Variable Rate Layer 2/3 TDM Traffic Pipe

Figure 6:
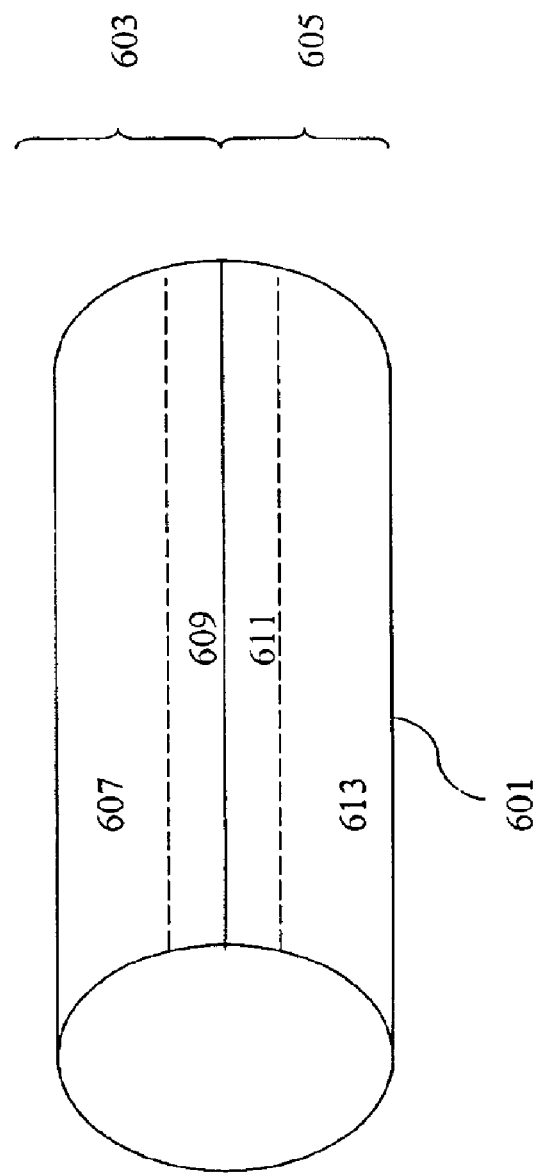
FIG. 6 is a conceptual diagram illustrating an exemplary division of an optical span's bandwidth according to one embodiment of the invention.

FIG. 6 is a conceptual diagram illustrating an exemplary division of an optical span's bandwidth according to one embodiment of the invention. In FIG. 6, the optical span's 601 bandwidth is evenly split between a working channel 603 and a protection channel 605. A segment of bandwidth 607 in the working channel 603 will carry TDM traffic. This segment of bandwidth 607 will be referred to as the working TDM pipe. While there is not a failure, the remaining bandwidth 609 of the working channel 603 forms a subpipe, all of the protection channel 605 forms a subpipe, and together these subpipes form a layer 2/3 pipe to transmit TDM traffic having layer 2/3 traffic (ATM, Ethernet, Frame Relay, Internet Protocol, etc.) as payload. While there is a failure, the segment of bandwidth 613 of the protection channel 607 will carry a protection switched stream of TDM traffic. The segment of bandwidth 611 of the protection channel 607 will be used as a protecting layer 2/3 subpipe to carry another stream of protection switched TDM traffic. The segment of bandwidth or working layer 2/3 subpipe 609 of the working channel 603 will carry the TDM traffic having layer 2/3 traffic as payload transmitted in the layer 2/3 pipe while there is not a failure.

Figure 7C:
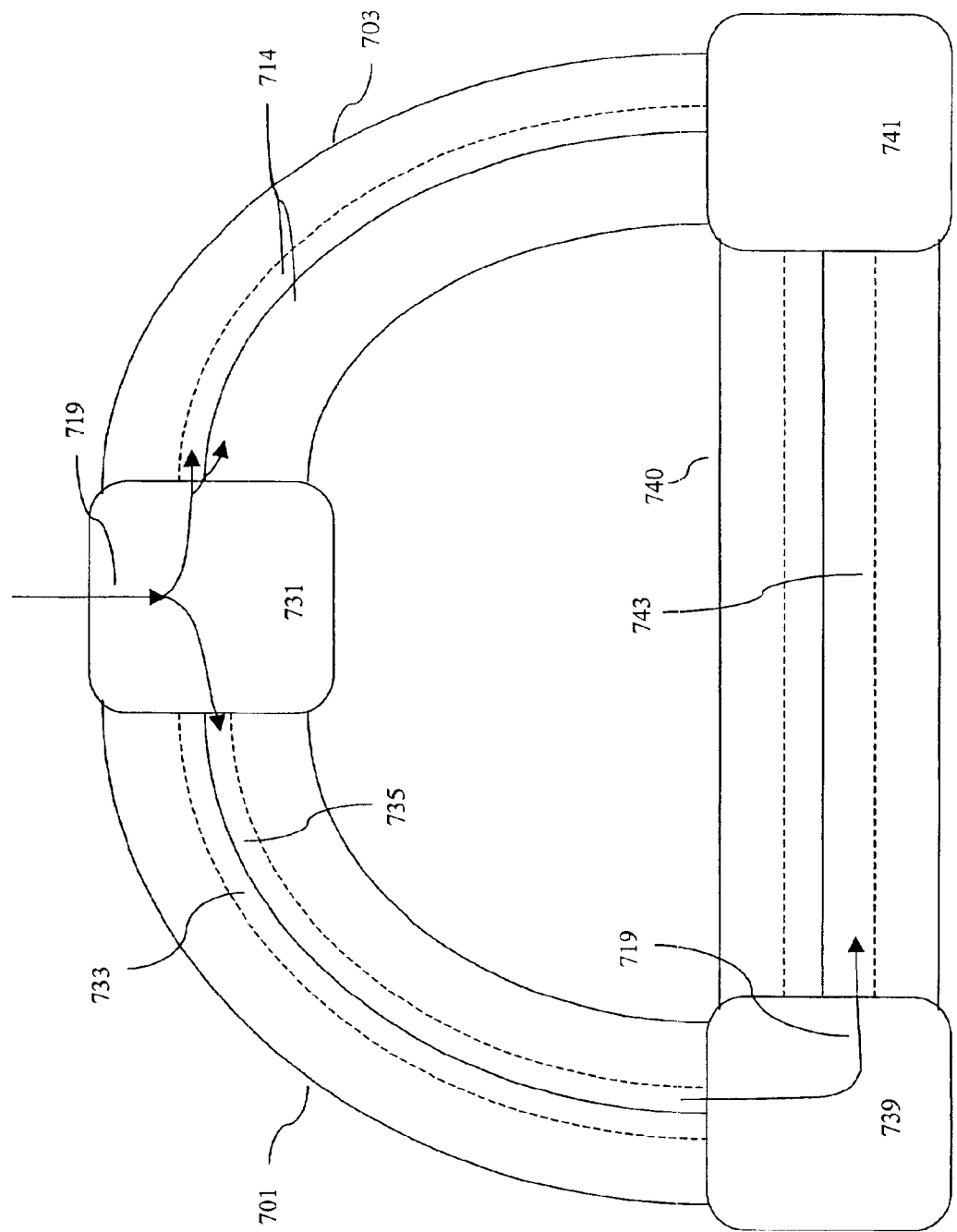
FIG. 7c is a diagram of the example traffic flow 719 of FIGS. 7a and 7b while there is not and is a failure of the span 703 of FIGS. 7a and 7b in a ring according to one embodiment of the invention.

FIGS. 7a–7c are diagrams illustrating example traffic flow while there is and is not a failure on an optical span according to one embodiment of the invention. FIG. 7a is a diagram illustrating an example traffic flow while there is not a failure in an optical span according to one embodiment of the invention. In FIG. 7a, a West transmit span 701 is divided into a working channel 705 and a protection channel 707. In FIG. 7a, the West transmit span 701 carries two streams of traffic. In a working TDM pipe 702 the West transmit span 701 carries a stream of TDM traffic 709. The West transmit span 701 carries another stream of TDM traffic 711 having layer 2/3 traffic as payload in a layer 2/3 pipe 712. The stream of TDM traffic 711 is represented by two lines to show the layer 2/3 pipe 712 encompassing a segment of the working channel 705 and all of the protection channel 707 (it should be noted that the layer 2/3 pipe need not encompass all of the protection channel 707—some of this channel could go unused and/or some of this channel could be used for a different purpose, e.g., extra traffic).

In FIG. 7a, an East transmit span 703 is also divided into a working channel 706 and a protection channel 708. The East transmit span 703 carries two streams of traffic. In a working TDM pipe 704 the East transmit span 703 carries a stream of TDM traffic 717. The East transmit span 703 carries another stream of TDM traffic 719 having layer 2/3 traffic as payload in a layer 2/3 pipe 714. The stream of TDM traffic 719 is represented by two lines to show the layer 2/3 pipe 714 encompassing a segment of the working channel 706 and all of the protection channel 708 (again, it should be noted that the layer 2/3 pipe need not encompass all of the protection channel 707).

The streams of TDM traffic 711 and 719 carry data traffic formatted according to a layer 2/3 protocol such as ATM, Ethernet, Frame Relay, Internet Protocol, etc. as payload. The streams of TDM traffic 711 and 719 can be transmitted in a number of scenarios. The streams of TDM traffic 711 and 719 may be switched into the ring through the packet switching mechanism in one node and exit the ring as TDM traffic from another node. The streams of TDM traffic 711 and 719 may be switched into the ring as layer 2/3 traffic through the packet switching mechanism in one node and exit the ring through the packet switching mechanism in another node in the form of layer 2/3 traffic. These examples are described as illustrations to aid in understanding the invention and not meant to be limiting upon the invention.

FIG. 7b is a diagram illustrating an example traffic flow while there is a failure in an optical span according to one embodiment of the invention. In FIG. 7b, the East transmit span 703 fails (e.g. a severed line, failing hardware, etc.). The West transmit span 701 continues to carry the stream of TDM traffic 709 in the working TDM pipe 702. The West transmit span 701 also continues to carry the stream of TDM traffic 711 having layer 2/3 traffic as payload, but only in a working layer 2/3 subpipe 733. A protecting layer 2/3 subpipe 735 now carries the stream of TDM traffic 719 having layer 2/3 traffic as payload because all traffic traveling in the working channel 706 of the East transmit span 703 prior to the failure was protection switched to the protection channel 707 of the West transmit span 701. The East stream of TDM traffic 717 now travels in the protecting TDM pipe 710 of the West transmit span 701. The West protecting TDM pipe 710 is the same size or number of timeslots as the working TDM pipe 704.

As shown in the illustration of FIGS. 7a and 7b, the streams of TDM traffic 709 and 717 are transmitted at a constant rate because they utilize the same amount of bandwidth while there is not and is a failure. In contrast, the streams of TDM traffic 711 and 719 are transmitted at a variable rate. While a failure does not exist, both streams of TDM traffic 711 and 719 are transmitted over the layer 2/3 pipe which is allocated a large segment of bandwidth including some of the working channel and all of the protection channel timeslots. While a failure exists, the streams of variable rate TDM traffic 711 and 719 are transmitted over layer 2/3 subpipes which are allocated an equal amount of the timeslots not used by the constant rate TDM traffic 709 and 717.

The variability in the pipe size is possible because of the statistical multiplexing capability of the packet switching mechanism in the network elements of the ring. Specifically, the reduction in the amount of available bandwidth for the TDM traffic having layer 2/3 traffic as payload requires the packets switch of the network element to buffer and/or to drop layer 2/3 traffic to make that traffic fit the provided pipe.

FIG. 7c is a diagram of the example traffic flow 719 of FIGS. 7a and 7b while there is not and is a failure of the span 703 of FIGS. 7a and 7b in a ring according to one embodiment of the invention. In FIG. 7c, three nodes 731, 739, and 741 connect to each other to form an optical ring. Each node in a ring has a West and East transmit span, but in FIG. 7c only the East and West transmit spans from the node 731 and an East transmit span from the node 739 are shown. The West transmit span 701 carries traffic from node 731 to node 739. The East transmit span 703 carries traffic from the node 731 to the node 741. The East transmit span 740 carries traffic from the node 739 to the node 741. As previously shown in FIG. 7a, the variable rate TDM traffic 719 travels over the layer 2/3 subpipe 714 to node 741. Once node 731's East transmit span 703 fails, the variable rate TDM traffic 719 travels over the protecting layer 2/3 subpipe 735. Since the variable rate TDM traffic 719 is destined for node 741, the variable rate TDM traffic 719 is switched through node 739 and travels along node 739's East transmit span 740 in its protecting layer 2/3 subpipe 743. Node 739 knows to transmit the variable rate TDM traffic 719 onto a protecting layer 2/3 subpipe because node 731 has communicated to 739 a protection switch.

As an illustration of the protection switch in relation to end users, assume that traffic from a first, second, and third user enter the ring illustrated in FIG. 7c at node 731. Also assume that the first and second user's traffic is to be terminated at node 741 and exit the ring at node 741 to an external network element. The third user is to be terminated at node 739 and exit the ring to an external network element. The traffic from all three users is transmitted over the layer 2/3 pipe from node 731 to node 741. The traffic from the third user is switched through the packet mesh of node 741 and transmitted over a second layer 2/3 pipe (not shown) between node 741 and node 739. As before, assume that there is a failure of span 703. While there is this failure, the traffic in the layer 2/3 pipe 714 is switched to the protecting layer 2/3 pipe 735. The traffic from all three users is passed through the cross connect of node 739 and terminated at node 741. The traffic from the first and second users exit the ring at node 741 while the traffic from the third user is switched through the packet mesh of node 741 and transmitted back to node 739 over the working subpipe of the second layer 2/3 pipe (not shown).

As illustrated in FIG. 7c, a failure on the ring does not cause the loss of the traffic on the layer 2/3 pipe, just a reduction in the available bandwidth. This is because the layer 2/3 pipe is made partially from the working channel and partially from the protection channel. As such, this layer 2/3 pipe is more sellable to customers than the extra traffic described in the background section because a failure does not result in a total loss of service. Moreover, using the BLSR protection scheme enables the traffic traveling in the layer 2/3 pipe to be protection switched in a 50 millisecond time frame.

To provide an example of the manner in which the layer 2/3 pipe could be sold, assume that the working and protection channel parts of the layer 2/3 pipe 714 are respectively 30 mbps and 90 mbps. Assume, that each of the first, second and third users above want an equal amount of bandwidth of the layer 2/3 pipe 714. Each customer could be offered a guaranteed (in the event of a single failure) 10 mbps and a maximum of 40 mbps. The customers traffic at node 731 would be statistically multiplexed to fit the size of the layer 2/3 pipe currently being provided. The guaranteed 10 mbps per customer would be provided by the working subpipe on span 703 or the protecting layer 2/3 subpipe 735. The maximum 30 mbps per customer would be provided by the protection subpipe on span 703 when there is no failure. In this manner partially BLSR protected layer 2/3 traffic is provided around the ring.

It should be understood that the ability to offer a guaranteed minimum bandwidth requires that the bandwidth of the layer 2/3 pipes on the ring not be oversold. Thus, in the above example, to offer the third user the service identified above, the ring provider would also have at least the needed bandwidth (guaranteed 10 mbps and a maximum of 40 mbps) on the second layer 2/3 pipe from node 741 to node 739 (not shown) because the third users traffic must traverse that span as well as span 703. In other words, if a potential user's traffic must traverse multiple spans of the ring in layer 2/3 pipes, each of these layer 2/3 pipes must have available the necessary bandwidth. Although the first, second, and third customers are each given a guaranteed bandwidth of 10 Mbps, it is possible for any of them to transmit greater than their guaranteed amount as long as others are transmitting less than their guaranteed amount. The total bandwidth cannot exceed 30 Mbps, but this amount can be divided arbitrarily as long as the guaranteed amounts hold.

It should also be noted that not every network element in the ring need to be of the type that is capable of both TDM and packet switching (a hybrid network element). Intermediate nodes that do not switch traffic out of the ring can be standard non-hybrid network elements. Thus, compatibility is maintained.

Figure 10:
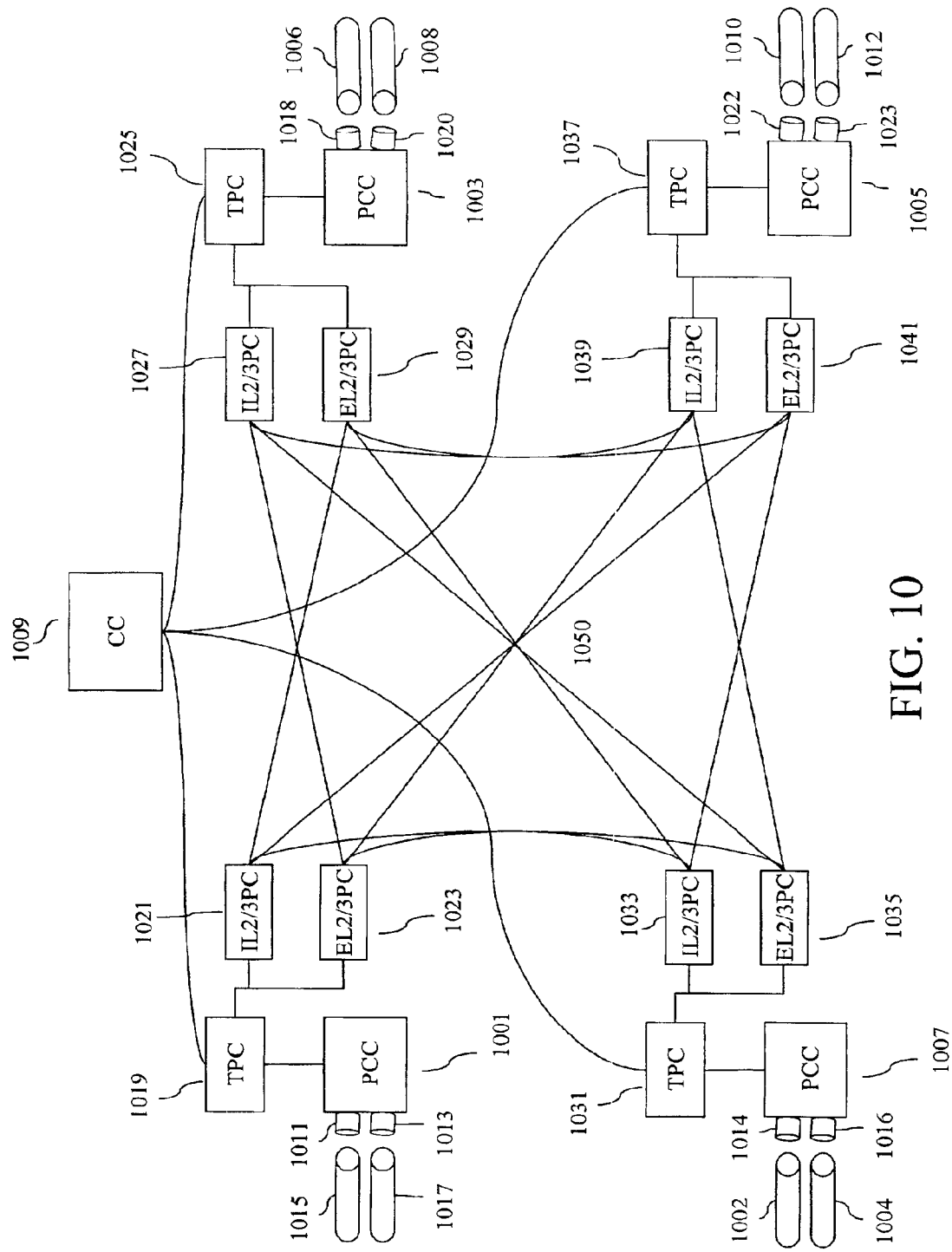
FIG. 10 is a diagram of circuit components in a hybrid network element according to one embodiment of the invention.

FIG. 10 is a diagram of circuit components in a hybrid network element according to one embodiment of the invention. While in this embodiment separate switching mechanisms are provided for the TDM and packet switching (namely a TDM switch fabric and a packet mesh), alternative embodiments could provide a single switching mechanism and/or different switching mechanisms (e.g., a packet switch fabric, a TDM mesh, etc.). In FIG. 10, four optical transmit fibers 1015, 1002, 1006, 1010 connect to physical ports 1011, 1014, 1018, and 1022 respectively. Four optical receive fibers 1017, 1004, 1008, and 1012 connect to physical ports 1013, 1016, 1020, and 1023 respectively. TDM traffic is received over the optical receive fibers 1017, 1004, 1008, 1012 and transmitted over the physical ports 1011, 1014, 1018, 1022. The TDM traffic is transmitted and received as optical signals by physical connection circuitry (PCC) 1001, 1007, 1003, 1005. The PCCs convert optical signals to electrical signals and vice versa for reception and transmission. The TDM traffic is transmitted and received between the PCCs 1001, 1007, 1003, 1005 and the TDM processing circuits (TPCs) 1019, 1031, 1025, and 1037 respectively as electrical signals. The TPCs transmit and receive TDM traffic from a control card (CC) 1009. In another embodiment of the invention, each TPC and PCC is located on a single processing element, such as an application specific integrated circuit (ASIC).

The layer 2/3 traffic can be switched through the CC 1009 or a packet mesh 1050. The TPCs are programmable to insert and extract particular STSs that carry layer 2/3 traffic to be packet switched. If TDM traffic contains layer 2/3 payload to be switched through the packet mesh 1050, then the TPCs 1019, 1031, 1025, and 1037 extract the layer 2/3 payload traffic from the TDM traffic and transmit the layer 2/3 traffic to ingress layer 2/3 processing circuitry 1021, 1033, 1027, and 1039 respectively. The TPCs 1019, 1031, 1025, and 1037 also receive layer 2/3 traffic from egress layer 2/3 processing circuitry 1021, 1033, 1027, and 1039 respectively. For a variable rate layer 2/3 traffic pipe, the egress layer 2/3 processing circuitry includes the ability to queue and statistically multiplex layer 2/3 traffic before transmitting it to a TPC. The TPCs 1019, 1031, 1025, and 1037 process the layer 2/3 traffic placing it into SONET/SDH frames for transmission in timeslots. The TPCs 1019, 1031, 1025, and 1037 are programmable to insert and extract particular STSs that carry the layer 2/3 traffic to be packet switched.

The CC 1009 detects failures, maintains a BLSR state machine, and updates the TDM cross connect table in response to changes in the BLSR state machine. The CC 1009 also sends a message to update the layer 2/3 forwarding tables for the packet BLSR protection switching. In addition, the CC 1009 sends messages to reprogram the TPCs to handle a protection switch (e.g., reorient concatenations, redirect channels to packet mesh and CC, etc.).

To provide an example of the reprogramming of the network elements to handle a ring switch, assume that the ring of FIG. 7c is a 2 fiber OC-12 BLSR (that is, 6 STSs for working and 6 STSs for protection in each direction). Also assume that each of the nodes of FIG. 7c is implemented as the network element illustrated in FIG. 10; that the PCC 1001 of a given node is connected through fiber to the PCC 1003 of the adjacent node; that the fibers 1015 and 1006 are the transmit fibers; that the PCC 1003 of node 731 is connected through fiber to PCC 1001 of node 741; and that the fibers 1017 and 1008 are the receive fibers. Table 1 below illustrates the concatenations and the redirection of STSs programmed in the TPCs 1019 and 1025 of each node while there is not and is a failure on span 703.

| | | While There is Not a Failure | | While There is a Failure | |
|---|---|---|---|---|---|
| Node | TDM | | Layer 2/3 Pipe | TDM | Layer 2/3 Pipe |
| 731 | On TPC 1019 for transmit fiber 1015: X on channels 1–4, where X is some particular arrangement On TPC 1025 for transmit fiber 1006: STS 1 on channel 1; STS 3C on channels 2–4 | | On TPC 1019 for transmit fiber 1015: STS 2C on channels 5–6; STS 6C on channels 7–12 On TPC 1025 for transmit fiber 1006: STS 2C on channels 5–6; STS 6C on channels 7–12 | On TPC 1019 for transmit fiber 1015: X on channels 1–4; STS 1 on channel 7 protecting TDM; STS 3C on channels 8–10 protecting TDM On TPC 1025 for transmit fiber 1006: Nothing | On TPC 1019 for transmit fiber 1015: STS 2C on channels 5–6; STS 2C on channels 11–12 protecting layer 2/3 subpipe On TPC 1025 for transmit fiber 1006: Nothing |
| 741 | On TPC 1019 for receive fiber 1017: STS 1 on channel 1; STS 3C on channels 2–4 On TPC 1025 for receive fiber 1008: Y on channels 1–4, where Y is some particular arrangement | | On TPC 1019 for receive fiber 1017: STS 2C on channels 5–6; STS 6C on channels 7–12 On TPC 1025 for receive fiber 1008: STS 2C on channels 5–6; STS 6C on channels 7–12 | On TPC 1019 for receive fiber 1017: Nothing On TPC 1025 for receive fiber 1008: Y on channels 1–4; STS 1 on channel 7 protecting TDM; STS 3C on channels 8–10 protecting TDM | On TPC 1019 for receive fiber 1017: Nothing On TPC 1025 for receive fiber 1008: STS 2C on channels 5–6; STS 2C on channels 11–12 protecting layer 2/3 subpipe |
| 739 | On TPC 1019 for transmit fiber 1015: Y on channels 1–4 On TPC 1025 for receive fiber 1008: X on channels 1–4 | | On TPC 1019 for transmit fiber 1015: STS 2C on channels 5–6; STS 6C on channels 7–12 On TPC 1025 for receive fiber 1008: STS 2C on channels 5–6; STS 6C on channels 7–12 | On TPC 1019 for transmit fiber 1015: Y on channels 1–4; STS 1 on channel 7 protecting TDM; STS 3C on channels 8–10 protecting TDM On TPC 1025 for receive fiber 1008: X on channels 1–4; STS 1 on channel 7 | On TPC 1019 for transmit fiber 1015: STS 2C on channels 5–6; STS 2C on channels 11–12 protecting layer 2/3 subpipe On TPC 1025 for receive fiber 1008: STS 2C on channels 5–6; STS 2C on channels 11–12 protecting layer 2/3 subpipe |

-continued

| | While There is Not a Failure | | While There is a Failure | |
|---|---|---|---|---|
| Node | TDM | Layer 2/3 Pipe | TDM | Layer 2/3 Pipe |
| | | | protecting TDM; STS 3C on channels 8–10 protecting TDM | |

In addition to the reprogramming of the TPCs, the cross connect tables and the forwarding tables are altered accordingly. As in the example described above, traffic for three users enter the ring at node 731 of FIG. 7c. The traffic from these three users are switching into the ring in node 731 from the PCC 1007 through the packet mesh 1050. While there is not a failure, the traffic from all three users is transmitted from the IL2/3PC 1033 across the packet mesh to the EL2/3PC 1029 according to the forward tables and transmitted in the layer 2/3 pipe by TPC 1025. While there is a failure of the fibers connecting into 731's PCC 1003, the forwarding tables are modified so that the traffic from the three users is switched through the packet mesh from IL2/3PC 1033 through the packet mesh 1050 to the EL2/3PC 1023 and transmitted in the protecting layer 2/3 pipe to node 739 by the TPC 1019 which has been reprogrammed as described above.

In node 739, the forwarding tables are modified because of the failure so that the traffic for the three users received from node 731 on node 739's PCC 1003 in the protecting layer 2/3 channel is switched through the packet mesh 1050 from the IL2/3PC 1027 to the EL2/3PC 1023 and transmitted to node 741 in the protecting layer 2/3 channel by the TPC 1019 which has been reprogrammed for the failure.

In node 741, the forwarding tables are modified because of the failure so that the traffic for users 1 and 2 received from node 739 on node 741's PCC 1003 is switched through the packet mesh 1050 from the IL2/3PC 1027 to the EL2/3PC 1041 and transmitted out of the ring through the PCC 1005. The traffic for the third user is switched through the packet mesh from the IL2/3PC 1027 to the EL2/3PC 1029 and transmitted out the PCC 1003 on the working layer 2/3 channel to node 739 by the TPC 1025. The traffic from the third user is received at node 739 at the PCC 1001 on the working layer 2/3 channel and switched through the packet mesh 1050 from the IL2/3PC 1021 to the EL2/3PC 1041 in accordance with the forwarding tables and transmitted out of the ring by the PCC 1005.

A four fiber BLSR can perform a span switch or ring switch depending on the type of failure in the ring. The forwarding tables and cross connect tables of the nodes in the ring must be updated in accordance with the type of protection switch performed in the 4 fiber BLSR ring. The concatenations must also be reoriented and channels redirected accordingly.

Figure 8:
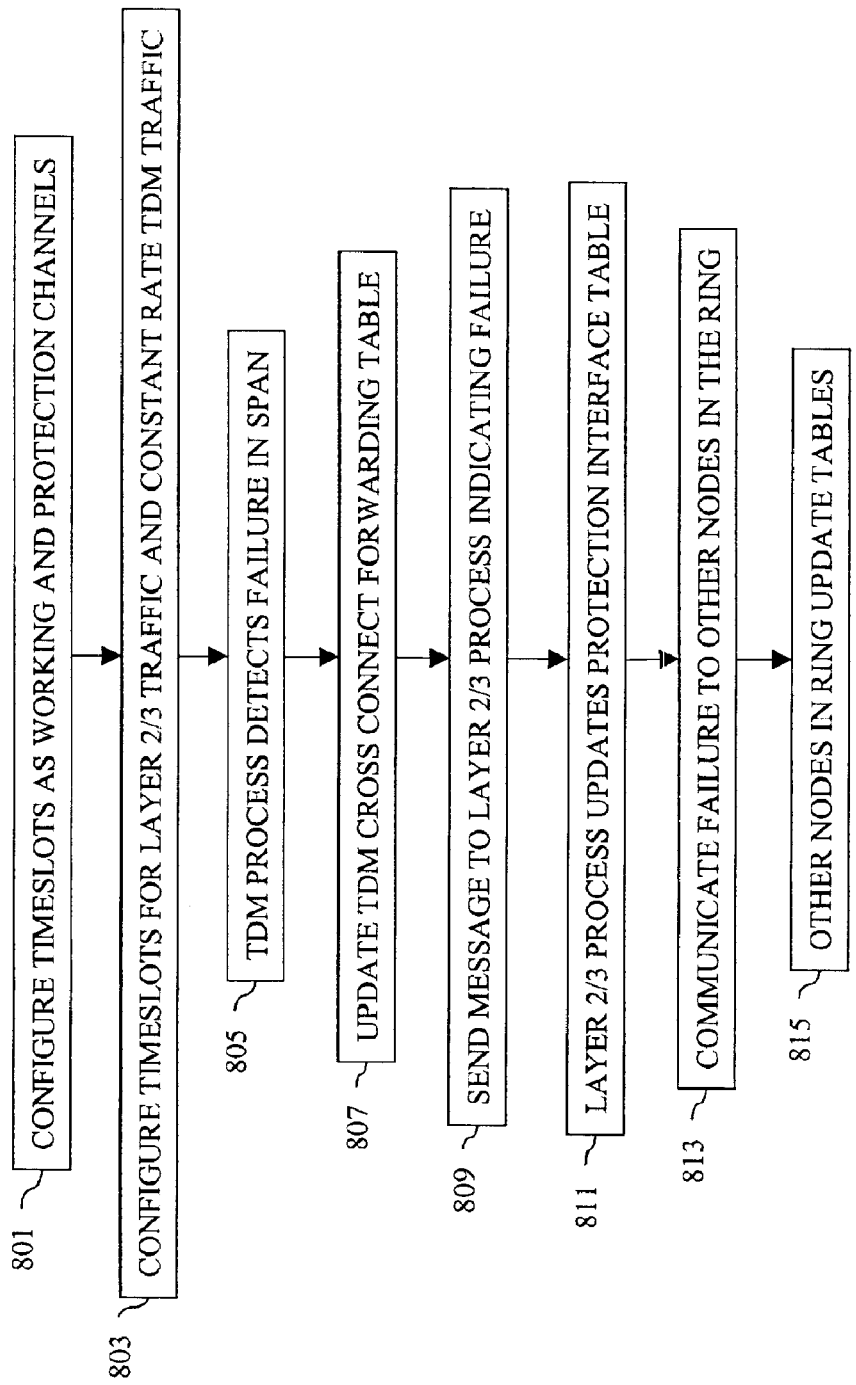
FIG. 8 is a flowchart for allocating a layer 2/3 pipe and subpipes in an optical ring according to one embodiment of the invention.

FIG. 8 is a flowchart for allocating a layer 2/3 pipe and subpipes in an optical ring according to one embodiment of the invention. At block 801, a network administrator configures timeslots as working and protection channels on each node of a ring. At block 803, the network administrator determines which timeslots will be processed as layer 2/3 traffic and which timeslots will be processed as TDM traffic. At block 805, a TDM process running on a control card of a node in the ring detects a failure in one of the node's spans. The TDM process updates a TDM cross connect forwarding table managed on the control card at block 807. At block 809, the TDM process sends a message to a layer 2/3 process indicating the failure. The layer 2/3 process updates a protection interface table in response to the message from the TDM process at block 811. At block 813, the node communicates the failure to other nodes in the ring. At block 815, the other nodes in the ring updates their cross connect tables in accordance with the failure detected by the detecting node. In another embodiment of the invention, the tables updated at block 815 include the cross connect table and the layer 2/3 forwarding tables.

In one embodiment of the invention, the protection interface table is a data structure with a reference to a logical working interface and a logical protection interface. The logical working interface corresponds to a physical port connecting to a transmit fiber to carry traffic destined for a node X going in a preferred direction on the ring. The logical protection interface corresponds to another physical port connected to a transmit fiber destined for the node X, but going in the opposite direction and possibly through other nodes in the ring. A logical interface stored in a layer 2/3 forwarding table initially refers to the logical working interface while there is not a failure. While there is a failure, the logical interface refers to the logical protection interface. When the failure is corrected, the logical interface is reset to refer to the logical working interface. In another embodiment of the invention, a routine manages logical interfaces and another routine manages alternate interfaces. A network administrator configures alternate interfaces on a network element. The alternate interface manager will create a data structure to refer to 2 logical interfaces which are managed by the interface manager. One of the interfaces will be the working interface while the other interface will be the protecting interface. In the layer 2/3 forwarding table, a circuit identifier is associated to either a logical interface or a alternate interface. Upon a failure notification, the alternate interface manager will alter the data structure to reference the logical interface acting as the protecting interface. In another embodiment of the invention, the TDM process instead of the layer 2/3 process updates a data structure indicating protection interfaces.

The owner of the optical ring can now offer protected service to multiple customers. Typically, only the traffic traveling in the working channel was sold to customers since consumers did not want to purchase a service which may be interrupted (e.g., for days). Alternatively, a consumer may choose to purchase at a reduced cost, the extra traffic service from 2 providers. This consumer would alternate between these providers as failures occurred. With a layer 2/3 pipe, the owner of the optical ring can offer multiple classes of service. In addition to the traditional constant rate TDM traffic service, the network owner or provider can offer a variable rate TDM traffic service to customers because the payloads are layer 2/3 units of traffic. For example, if bandwidth corresponding to a layer 2/3 pipe transmits at a rate of 100 megabits per second with 20 megabits corresponding to the layer 2/3 subpipes, the owner or provider can offer a service guaranteeing a rate of 20 megabits per second with a maximum of 100 megabits per second. This variable rate service can be offered to multiple people since the TDM payloads are layer 2/3 units of traffic. In addition, the variable rate service can be offered with a BLSR protection time of 50 milliseconds. Furthermore, the owner or provider of the optical network, is not forced to either donate or sell at a reduced cost 50% of their bandwidth. The owner of provider can sell 100% of its bandwidth with the combination of standard TDM service and the variable rate TDM service.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described. Although the invention has been described with reference to the TDM form of optical switching, the invention can be applied to any form of optical switching including wave division multiplexing, dense wave division multiplexing, etc. using various forms of optical ring protection. In addition, the invention has been described with respect to a 2 fiber and 4 fiber BLSR, but can be scaled to other n-fiber architectures of BLSR.

Furthermore, while the invention has been described in terms of switching the traffic in the layer 2/3 pipe through the packet mesh of each node while there is not a failure, a variety of configurations are possible for an optical ring with a layer 2/3 pipe. In a five node ring, a first node may have a layer 2/3 pipe defined over a direct connection to a second node. The first node may also have a layer 2/3 pipe defined over a logical direct connection to a third node through the cross connect of the second node. The first node may also have a layer 2/3 pipe defined over a logical direct connection to a fifth node through the fourth node's cross connect. An optical ring may have 4 nodes which are hybrid network elements and 2 nodes which are TDM only network elements. The TDM only network elements may only act as regenerators between the hybrid network elements. A first hybrid node may have a layer 2/3 pipe defined to a second layer 2/3 pipe through a TDM only node. The first hybrid node may have a layer 2/3 pipe defined to the TDM only node while a another layer 2/3 pipe is defined from the TDM only node to the second hybrid node. These examples are provided to aid in the understanding of the invention and not meant to be limiting upon the invention.

In addition, although the traffic that is passing through a given node (being provided to that node on a span of the ring and being transmitted by that node out another span of the ring) in layer 2/3 pipes may be switched through the packet mesh of that node, the traffic is not considered to be terminated from the ring at that node, but is rather considered to still be on the ring (similar to the manner in which virtual tributaries (VTs) are considered to not be terminated from the ring). However, since each packet is addressed individually, squelching is not needed as with a VT ring.
Combining the Non-BLSR Protected Layer 2/3 Channel and the Variable Rate Layer 2/3 TDM Traffic Pipe To describe the combining of a non-BLSR protected layer 2/3 channel and a variable rate layer 2/3 pipe on a single ring, a example from before will be expanded upon. In the previous example, it was assumed that a ring supported OC-48 in each direction. In addition, since STS-24 was allocated for the non-BLSR protected layer 2/3 channel in each direction, there was STS-12 left for each of the working and protection channels in each direction. From a layer 2/3 perspective, the hybrid network elements of the ring appear as packet network elements each with the ability to transmit and receive the packet equivalent of STS-24 with the other hybrid network elements. From a TDM perspective, the network elements of the ring appear as a ring with STS-24 in each direction (STS-12 working and STS-12 protection).

To expand on this example, since from the TDM perspective the ring can be viewed and is operated as an OC-24 BLSR, a variable rate layer 2/3 pipe can be configured on this OC-24 BLSR. Thus, whereas in FIG. 7c the entire ring bandwidth (e.g., OC-48 in each direction) was split between working and protection channels and the variable rate layer 2/3 pipe took up part of both the working and protection channels when there was no failure; in this embodiment half (OC-24 in each direction) of the physical ring bandwidth (OC-48 in each direction) is allocated to form the non-BLSR protected layer 2/3 channel and the other half is allocated to form a BLSR (with working and protection channels) with a variable rate layer 2/3 pipe configured in that BLSR.

Configuring a non-BLSR protected layer 2/3 channel on an optical ring in conjunction with allocating a segment of the working channel and protection channel for a variable rate layer 2/3 pipe increases utilization of bandwidth of an optical ring, as well as the classes and types of services an owner of an optical ring can provide to customers. Hence, the owner of the optical ring extracts more use of the optical ring than with a standard BLSR.

Figure 9A:
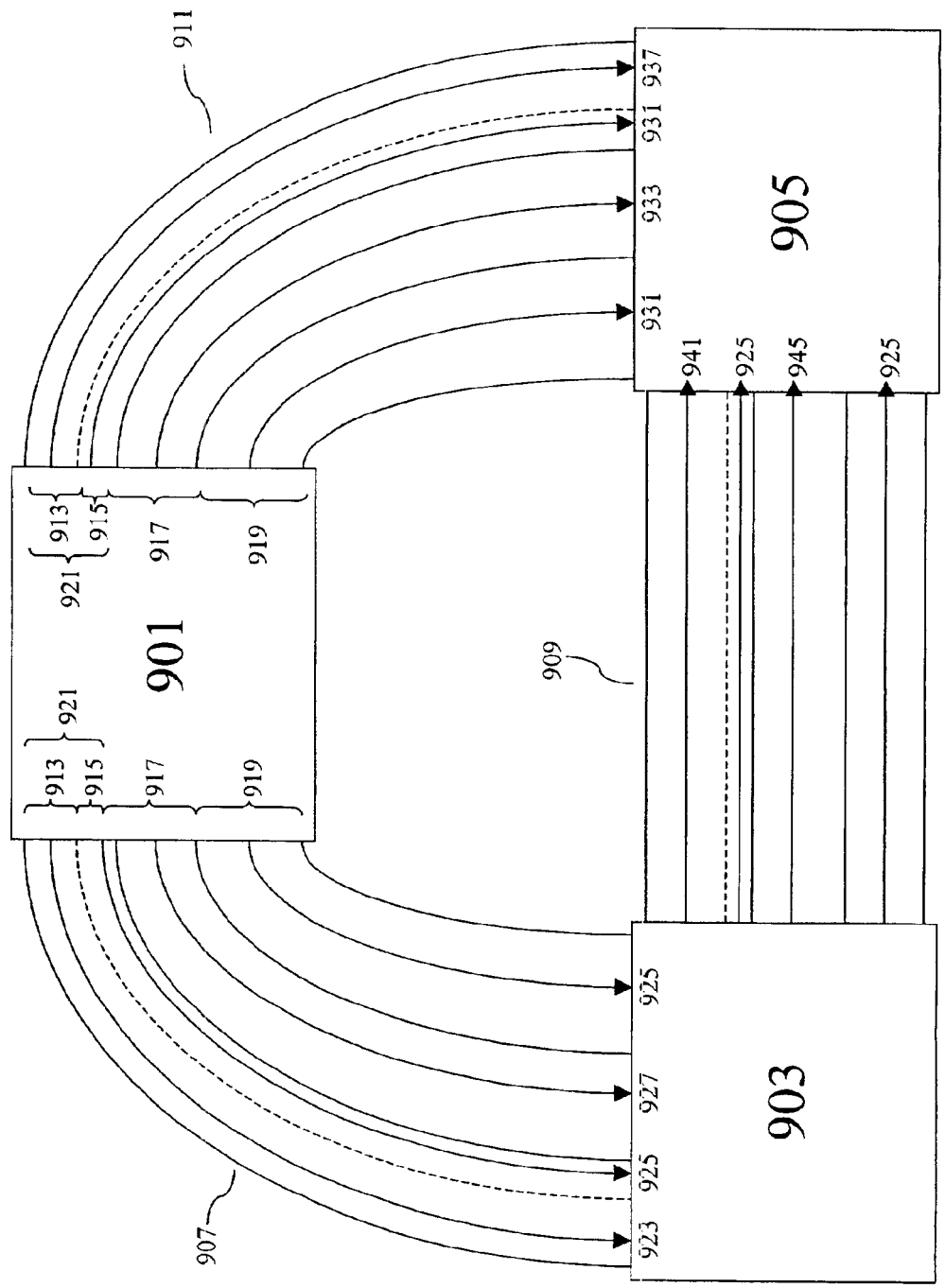
FIG. 9a is a conceptual diagram illustrating exemplary traffic flow over an optical ring having a variable rate layer 2/3 pipe and a non-BLSR protected layer 2/3 channel while there is not a failure according to one embodiment of the invention.
Figure 9B:
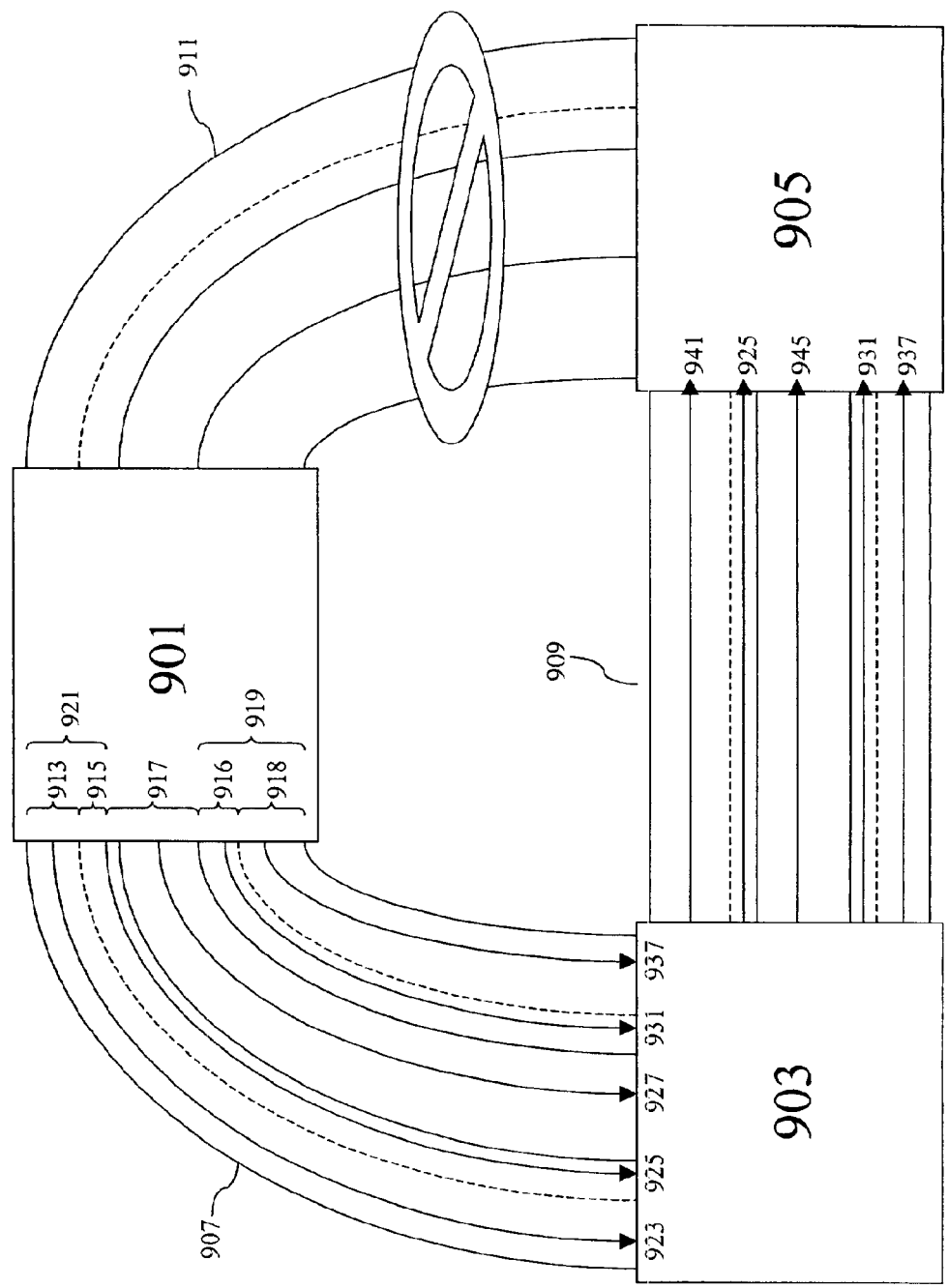
FIG. 9b is a diagram illustrating exemplary traffic flow over a optical ring having the variable rate layer 2/3 pipe and the non-BLSR protected layer 2/3 channel during a failure in the ring according to one embodiment of the invention.

FIGS. 9a–9b are conceptual diagrams of a 3 node bi-directional line switched ring (BLSR) having a variable rate layer 2/3 pipe and a non-BLSR protected layer 2/3 channel with exemplary traffic flow whenever a failure exists and does not exist in the ring according to one embodiment of the invention. FIG. 9a is a conceptual diagram illustrating exemplary traffic flow over an optical ring having a variable rate layer 2/3 pipe and a non-BLSR protected layer 2/3 channel while there is not a failure according to one embodiment of the invention. Each node in a BLSR has an East and West span, but in FIG. 9a only the East and West transmit fibers 907, 911 of node 901 and the East transmit fiber of node 903 are shown. The timeslots for each fiber are allocated to a working channel 921, a protection channel 919, and a non-BLSR protected layer 2/3 channel 917. The timeslots for the working channel 921 are divided between a working TDM pipe 913 and a working channel layer 2/3 subpipe 915 of the variable rate layer 2/3 pipe. The remainder of the variable rate layer 2/3 pipe is allocated in the protection channel 919.

A flow of TDM traffic 937 is transmitted in the working TDM pipe 913 of the working channel 921 of the East transmit fiber 911 from node 901 to node 905. A flow of layer 2/3 TDM traffic 933 is transmitted in the non-BLSR protected layer 2/3 channel 917 of the East transmit fiber 911 from node 901 to node 905. A flow of TDM traffic having layer 2/3 traffic as payload 931 is transmitted in the protection channel 919 and the working channel 915 of the East transmit fiber 911.

In this illustration, all of the timeslots for the protection channel 919 are being used as part of the variable rate layer 2/3 pipe. In another embodiment, only a subset of the timeslots allocated for the protection channel 919 would be used as the variable rate layer 2/3 pipe, thereby allowing the remaining timeslots of the protection channel to be used for other purposes such as another non-BLSR protected layer 2/3 channel or extra traffic. Although the protection channel part and the working channel part of the variable rate layer 2/3 pipe are non-contiguous timeslots in FIG. 9a, while there is not a failure in the ring the 2 subpipes are used as the single logical pipe.

A flow of TDM traffic 923 is transmitted in the working TDM pipe 913 of the working channel 921 of the West transmit fiber 907 from node 901 to node 903. A flow of layer 2/3 TDM traffic 927 is transmitted in the non-BLSR protected layer 2/3 channel 917 of the West transmit fiber 907 from node 901 to node 903. A flow of TDM traffic having layer 2/3 traffic as payload 925 is transmitted in the variable rate layer 2/3 pipe made up of part of the protection channel 919 and the working channel layer 2/3 subpipe 915 of the working channel 921 of the West transmit fiber 907.

The flow of the traffic 925 is destined for node 905 and therefore continues in the protection channel 919 and working channel layer 2/3 subpipe 915 of node 903's East transmit fiber 909 to node 905. A flow of working TDM traffic 941 is transmitted from node 903 to node 905 in the working TDM pipe 913 of the working channel 921 of node 903's East transmit fiber 909. A flow of layer 2/3 TDM traffic 945 is transmitted from node 903 to node 905 in the non-BLSR protected layer 2/3 channel 917 of node 903's East transmit fiber 909.

FIG. 9b is a diagram illustrating exemplary traffic flow over a optical ring having the variable rate layer 2/3 pipe and the non-BLSR protected layer 2/3 channel during a failure in the ring according to one embodiment of the invention. In FIG. 9b, the East transmit span 911 of node 901 has failed. The flow of working TDM traffic 923 and layer 2/3 TDM traffic 927 continues to flow as illustrated in FIG. 9a. The working TDM traffic 937 has been protection switched to flow over the protecting TDM pipe 918 of the protection channel 919 on node 901's West transmit span 907 and node 903's East transmit span 909 until termination at node 905. Thus, part of the protection channel 919 on the span 907 and 909 has been used. As such, the variable rate layer 2/3 pipe carrying the traffic 925 has been reduced to only the working channel layer 2/3 subpipe 915 on the span 907 and 909.

The variable rate layer 2/3 pipe carrying the traffic 931 has been reduced and switched to a protecting layer 2/3 subpipe 916 on the protection channel 919 on the spans 907 and 909. The flow of working TDM traffic 941 and flow of layer 2/3 TDM traffic 945 continue to flow as illustrated in FIG. 9a.

With the combination of a non-BLSR protected layer 2/3 channel and a variable rate layer 2/3 pipe the traffic carried over an optical ring is diversified. Moreover, a BLSR with a non-BLSR protected layer 2/3 channel and a variable rate layer 2/3 pipe maintains a greater number of traffic flows (luring a failure in the BLSR than a standard BLSR. The provider or owner of the optical ring can offer 4 types of services now. Firstly, the provider can provide typical guaranteed service for TDM traffic. Secondly, the provider can provide the protection channel to carry unguaranteed extra TDM traffic. Thirdly, the provider can provide the non-BLSR protected Layer 2/3 channel to carry Layer 2/3 TDM traffic. Fourthly, the provider can provide the variable rate layer 2/3 pipe to carry layer 2/3 traffic at a guaranteed minimum bandwidth and a possible maximum bandwidth.

An owner of an optical ring can offer the optical ring as a variety of network packages to customers. An example of an optical ring with 100 megabits per second (Mbps) transmit fibers having a variable rate layer 2/3 pipe has previously been discussed. By adding a non-BLSR protected layer 2/3 channel to the 100 Mbps fiber, the network owner has a myriad of options. The network owner can divide the 100 Mbps of bandwidth as follows: 30 Mbps of bandwidth allocated to a working channel; 30 Mbps of bandwidth allocated to a protection channel; and 40 Mbps of bandwidth allocated to a non-BLSR protected layer 2/3 channel. In this example, 10 Mbps of the working channel bandwidth is allocated to a working variable rate layer 2/3 pipe. The remaining 20 Mbps of the working channel is the working TDM pipe The combination of the working variable rate layer 2/3 pipe and the protection channel is the variable rate layer 2/3 pipe. The variable rate layer 2/3 pipe provides a maximum bandwidth of 40 Mbps and a guaranteed bandwidth of 10 Mbps.

The owner can provide the 20 Mbps working TDM pipe for typical guaranteed TDM service. The owner can provide the 40 Mbps non-BLSR protected layer 2/3 channel and the 40/10 Mbps variable rate layer 2/3 pipe as a 60/30/10 hybrid variable rate pipe. Whenever a failure has not occurred in the optical ring, TDM traffic is transmitted over a working TDM pipe at 20 Mbps and layer 2/3 TDM traffic is transmitted over a hybrid variable rate pipe at 60 Mbps. When a failure occurs on a span carrying the working TDM pipe and the hybrid variable rate pipe, the TDM traffic is switched to a non-failing span and continues to be transmitted at 30 Mbps in the protection channel of the non-failing span. The layer 2/3 TDM traffic traveling in the working variable rate layer 2/3 pipe of the failing span is switched to a protecting variable rate layer 2/3 pipe in the non-failing span and is transmitted at 10 Mbps. Layer 2/3 TDM traffic traveling in a hybrid variable rate pipe in a non-failing span loses 20 Mbps of bandwidth to the TDM traffic protection switch from the failing span and 10 Mbps of bandwidth to the protection switched layer 2/3 TDM traffic of the failing span. Thus, the layer 2/3 TDM traffic traveling on the non-failing span is reduced from 60 Mbps of bandwidth to 30 Mbps of bandwidth instead of 10 Mbps of bandwidth.

If packet BLSR protection is implemented for the non-BLSR protected layer 2/3 channel, then the hybrid variable rate pipe offers different rates of transfer in response to a failure on the ring. BLSR. Using the bandwidth division in the example already discussed traffic flows at the same rates when a failure has not occurred on the ring. When a span fails, the TDM traffic traveling in the working TDM pipe of the failing span is protection switched and continues transmission at 20 Mbps. The TDM traffic will also flow at the same rates as discussed in the previous example whenever there is or is not a failure in the ring. Layer 2/3 TDM traffic traveling in the 10 Mbps working variable rate layer 2/3 pipe of the failing span is switched to a 10 Mbps protecting variable rate layer 2/3 pipe of a non-failing span. Layer 2/3 TDM traffic traveling in the non-BLSR protected layer 2/3 channel of the failing span is switched and tunneled through the non-BLSR protected layer 2/3 of the non-failing span. The layer 2/3 tunneled TDM traffic is statistically multiplexed with the layer 2/3 TDM traffic already being transmitted in the non-BLSR protected layer 2/3 channel of the non-failing span. The layer 2/3 TDM traffic traveling in the working variable rate layer 2/3 pipe of the non-failing span continues to be transmitted at 10 Mbps. Since the layer 2/3 TDM traffic of the non-failing span and the layer 2/3 tunneled TDM traffic from the failing span are statistically multiplexed, the owner can allocate the bandwidth of the non-BLSR protected layer 2/3 channel of the non-failing span is accordance with network policy or priority level.

Hence, the owner of the optical network still provides the hybrid variable rate pipe with a guaranteed bandwidth of 10 Mbps and a maximum bandwidth of 60 Mbps, however the owner can customize the bandwidth of the non-BLSR protected layer 2/3 channel.

If fragmented concatenation is implemented for the hybrid variable rate pipe, then traffic flowing over the hybrid variable rate pipe can be received and processed as a single concatenated set of traffic. Fragmented concatenation of the traffic flowing over the hybrid variable rate pipe will ease management and processing of the traffic flowing in the hybrid variable rate pipe. In another embodiment, the hybrid variable rate pipe can include multiple non-BLSR protected layer 2/3 channels. Fragmented concatenation can be applied to these multiple non-BLSR protected layer 2/3 channel segments of the hybrid variable rate pipe in order to distinguish traffic from different customers. Distinguishing traffic from different customers enables the owner of the network to offer varying classes of services and allocate the bandwidth of the hybrid variable rate pipe in accordance with policy decisions and the classes of services offered by the owner of the network.

Exemplary Implementation of a Hybrid Network Element

FIG. 10 is a diagram of circuit components in a hybrid network element according to one embodiment of the invention. While in this embodiment separate switching mechanisms are provided for the TI)M and packet switching (namely a TDM switch fabric and a packet mesh), alternative embodiments could provide a single switching mechanism and/or different switching mechanisms (e.g., a packet switch fabric, a TDM mesh, etc.). In FIG. 10, four optical transmit fibers 1015, 1002, 1006, 1010 connect to physical ports 1011, 1014, 1018, and 1022 respectively. Four optical receive fibers 1017, 1004, 1008, and 1012 connect to physical ports 1013, 1016, 1020, and 1023 respectively. TDM traffic is received over the optical receive fibers 1017, 1004, 1008, 1012 and transmitted over the optical transmit fibers 1011, 1014, 1018, 1022. The TDM traffic is transmitted and received as optical signals by physical connection circuitry (PCC) 1001, 1007, 1003, 1005. The PCCs convert optical signals to electrical signals and vice versa for reception and transmission. The TDM traffic is transmitted and received between the PCCs 1001, 1007, 1003, 1005 and the TDM processing circuits (TPCs) 1019, 1031, 1025, and 1037 respectively as electrical signals. The TPCs transmit and receive TDM traffic from a control card (CC) 1009. In another embodiment of the invention, each TPC and PCC is located on a single processing element, such as an application specific integrated circuit (ASIC). A hybrid network element is described in more detail in a patent application titled "Method and Apparatus for Switching Data of Different Protocols" to David Stiles and Gerald W. Neufeld, filed on Mar. 30, 2001, Ser. No: 09/823,480, which is hereby incorporated by reference.

The layer 2/3 traffic can be switched through the CC 1009 or a packet mesh 1050. The TPCs are programmable to insert and extract particular STSs that carry layer 2/3 traffic to be packet switched. If TDM traffic contains layer 2/3 payload to be switched through the packet mesh 1050, then the TPCs 1019, 1031, 1025, and 1037 extract the layer 2/3 payload traffic from the TDM traffic and transmit the layer 2/3 traffic to ingress layer 2/3 processing circuitry 1021, 1033, 1027, and 1039 respectively. The TPCs 1019, 1031, 1025, and 1037 also receive layer 2/3 traffic from egress layer 2/3 processing circuitry 1021, 1033, 1027, and 1039 respectively. For a variable rate layer 2/3 traffic pipe, the egress layer 2/3 processing circuitry includes the ability to queue and statistically multiplex layer 2/3 traffic before transmitting it to a TPC. The TPCs 1019, 1031, 1025, and 1037 process the layer 2/3 traffic placing it into SONET/SDH frames for transmission in timeslots. The TPCs 1019, 1031, 1025, and 1037 are programmable to insert and extract particular STSs that carry the layer 2/3 traffic to be packet switched.

The CC 1009 detects failures, maintains a BLSR state machine, and updates the TDM cross connect table in response to changes in the BLSR state machine. The CC 1009 also sends a message to update the layer 2/3 forwarding tables for the packet BLSR protection switching. In addition, the CC 1009 sends messages to reprogram the TPCs to handle a protection switch (e.g., reorient concatenations, redirect channels to packet mesh and CC, etc.).

With respect to reprogramming the TPCs to handle a protection switch, assume that the network element illustrated in FIG. 10 is node 901 of FIGS. 9a and 9b. Also assume that the ring in FIGS. 9a and 9b is a 2 fiber OC-12 ring. The TPC 1025 of FIG. 10 is programmed to transmit TDM traffic as a STS-1, STS-1, STS-1, STS-3c, STS-3c, and STS-3c set of pipes (the configuration depends on the version of non-BLSR protected layer 2/3 channel implemented, but this example is based on a version compliant with standard BLSR). When there is no failure in this example, the working TDM pipe 913 of the span 911 carries the working TDM traffic 937 from node 901 to node 905 as STS-1 in channel 1. The span 911 corresponds to the transmit fiber 1006 of FIG. 10. The traffic 931 is carried on the span 911 from node 901 to node 905 in the working layer 2/3 pipe 915 and the protection channel 919 as 2 pipes: the working layer 2/3 pipe 915 as 2 STS-1s in channels 2 and 3; and the protecting layer 2/3 pipe as STS-3c in channels 7-9, shown as 916 in FIG. 9b. Traffic 933 is carried in the non-BLSR protected layer 2/3 channel 917 as 2 STS-3c pipes in channels 4-6 and 10-12. The TPC 1019 is programmed in the same manner.

While there is a failure in the span 911 carrying traffic from node 901 to node 905, the cross connect table in the control card 1009 is updated. Traffic to be transmitted out the PCC 1003 is now transmitted out the PCC 1001 and the TPC 1019 is reprogrammed. The non-BLSR protected layer 2/3 channel remains unchanged. The traffic transmitted over the non-BLSR protected layer 2/3 channel continues to be transmitted in 2 STS-3c pipes on channels 4-6 and 10-12 in this example. The working TDM traffic 923 is still transmitted as an STS-1 over channel 1. The traffic transmitted in the working layer 2/3 pipe is still transmitted as 2 STS-1s in channels 2 and 3. The TPC 1019 is reprogrammed to transmit the traffic 937 as an STS-1 in channel 7. Traffic is transmitted over the protecting layer 2/3 pipe 916 as 2 STS-1s in channels 8 and 9. Node 901 informs node 903 of the failure. Node 903 reprograms a TPC which receives traffic from 901 and reprograms a TPC which transmits traffic to node 905 in accordance with TPC 1019 of node 901. Node 905 is adjacent to the failure and has reprogrammed a TPC which receives and transmits traffic to node 903 in the same manner.

In contrast to the example provided, non-standard time slot allocation and non-standard concatenations enable flexible provisioning of channels.

In one embodiment, the fragmented concatenations are implemented by constructing the hybrid network elements to include the ability to be programmed with which STSs are part of the fragmented concatenation. In particular, the TPC circuit is programmable to extract the STSs from the incoming SONET/SDH frames that make up the fragmented concatenation and provide them to the IL2/3PC. The IL2/3PC will treat the incoming STSs that are part of the fragmented concatenation as a single stream for statistical multiplexing purposes. The egress of such traffic to the ring will be handled in a similar manner.

In one embodiment, the non-BLSR protected Layer 2/3 channel(s) are implemented by constructing the hybrid network elements to include the ability to programmably mask BLSR protection on a STS-1 basis as defined in the standard defining the NUT channel.

In one embodiment, the non-BLSR protected layer 2/3 traffic can be packet BLSR protection switched by constructing the hybrid network elements to include the ability for the control card and the ingress layer 2/3 processing circuitry to communicate to each other. In one embodiment, the control card commands the ingress layer 2/3 processing circuitry to update protection data structures in response to a change in the BLSR state machine. The ingress layer 2/3 processing circuitry manages data structures indicating protection interfaces and/or protection groups which are alternate physical interfaces or a tunnel. In another embodiment, the control card updates a data structure in response to a change in the BLSR state machine. The data structure identifies a protection interface. The ingress layer 2/3 processing circuitry maintains forwarding tables which reference the data structure.

In one embodiment, combining the non-BLSR protected layer 2/3 channel and the variable rate layer 2/3 TDM traffic pipe is implemented by constructing the hybrid network elements to inhibit BLSR protection switching on the timeslots allocated for the non-BLSR protected layer 2/3 channel(s) and to communicate between the layer 2/3 section and TDM section of the hybrid network elements. In particular, the control card will not alter the cross connect forwarding table for timeslots allocated for the non-BLSR protected layer 2/3 channel. The egress layer 2/3 processing circuitry will queue and statistically multiplex layer 2/3 traffic before transmitting to the TPC.

Alternative Embodiments

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A machine-readable medium that provides instructions, which when executed by a set of processors, cause said set of processors to perform operations comprising:
   transmitting a first set of traffic at a first rate on a first span of an optical ring;
   transmitting a second set of traffic at the first rate on a second span of the optical ring;
   reducing transmission of the first set of traffic to a second rate while there is a failure on the second span;
   switching the second set of traffic to the first span;
   transmitting the second set of traffic at a third rate while there is a failure on the second span; and
   wherein the first set of traffic is transmitted in a non-contiguous set of physical channels and the first set of traffic is fractionally concatenated.

2. The machine-readable medium of claim 1 wherein the first and second set of traffic are transmitted in a non-BLSR protected layer 2/3 channel, a segment of a working channel, and at least a segment of a protection channel.

3. The machine-readable medium of claim 1 wherein switching the second set of traffic is performed with BLSR automatic protection switching.

4. The machine-readable medium of claim 1 wherein the first set of traffic is transmitted in a contiguous set of physical channels.

5. The machine-readable medium of claim 1 wherein the first set of traffic is transmitted in a non-contiguous set of physical channels.

6. A computer implemented method comprising:
   transmitting a first set of traffic at a first rate on a first span of an optical ring;
   transmitting a second set of traffic at the first rate on a second span of the optical ring;
   reducing transmission of the first set of traffic to a second rate while there is a failure on the second span;
   switching the second set of traffic to the first span;
   transmitting the second set of traffic at a third rate while there is a failure on the second span; and
   wherein the first set of traffic is transmitted in a non-contiguous set of physical channels and the first set of traffic is fractionally concatenated.

7. The computer implemented method of claim 6 wherein the first and second set of traffic are transmitted in a non-BLSR protected layer 2/3 channel, a segment of a working channel, and at least a segment of a protection channel.

8. The computer implemented method of claim 6 wherein switching the second set of traffic is performed with BLSR automatic protection switching.

9. The computer implemented method of claim 6 wherein the first set of traffic is transmitted in a contiguous set of physical channels.

10. The computer implemented method of claim 6 wherein the first set of traffic is transmitted in a non-contiguous set of physical channels.

* * * * *